(12) United States Patent
Dinh et al.

(10) Patent No.: US 12,096,131 B2
(45) Date of Patent: Sep. 17, 2024

(54) METHOD OF GENERATING NOISE-REDUCED IMAGE DATA AND ELECTRONIC DEVICE FOR PERFORMING THE SAME

(71) Applicant: SAMSUNG ELECTRONICS CO., LTD., Suwon-si (KR)

(72) Inventors: Quockhanh Dinh, Suwon-si (KR); Kyonghwan Jin, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 17/512,338

(22) Filed: Oct. 27, 2021

(65) Prior Publication Data

US 2022/0132001 A1 Apr. 28, 2022

Related U.S. Application Data

(63) Continuation of application No. PCT/KR2021/012433, filed on Sep. 13, 2021.

(30) Foreign Application Priority Data

| Oct. 27, 2020 | (KR) | 10-2020-0140681 |
| Nov. 11, 2020 | (KR) | 10-2020-0149889 |

(51) Int. Cl.
  *G06T 7/90* (2017.01)
  *G06F 18/214* (2023.01)
  (Continued)

(52) U.S. Cl.
  CPC ......... *H04N 23/81* (2023.01); *G06F 18/2148* (2023.01); *G06F 18/40* (2023.01);
  (Continued)

(58) Field of Classification Search
  CPC ........ H04N 23/81; H04N 23/90; H04N 9/646; H04N 23/10; H04N 23/60; H04N 25/63;
  (Continued)

(56) References Cited

U.S. PATENT DOCUMENTS

| 6,965,691 B2 | 11/2005 | Walmsley et al. |
| 9,020,302 B2 | 4/2015 | Shmunk |

(Continued)

FOREIGN PATENT DOCUMENTS

| KR | 1020170078516 A | 7/2017 |
| KR | 1020190075057 A | 6/2019 |

(Continued)

OTHER PUBLICATIONS

Communications dated Dec. 24, 2021 issued by the International Searching Authority (PCT/ISA/210, PCT/ISA/220 and PCT/ISA/237) in application No. PCT/KR2021/012433.

(Continued)

*Primary Examiner* — Ali Bayat
(74) *Attorney, Agent, or Firm* — Sughrue Mion, PLLC

(57) ABSTRACT

A method includes obtaining, by a second processor of the electronic device, from a first processor of the electronic device, a control signal for obtaining image data, loading any one learning model of at least one learning model into a memory, obtaining, by using the camera module, raw image data of the object, from light reflected from the object, the raw image data being configured to have a specified color array consisting of a plurality of colors with respect to a plurality of pixels, obtaining, by using the loaded any one learning model, a color data set with respect to the plurality of pixels from the obtained raw image data, the color data set including a plurality of pieces of color data classified (Continued)

according to the plurality of colors, and obtaining the noise-reduced image data of the object by using the obtained color data set.

15 Claims, 13 Drawing Sheets

(51) Int. Cl.
| | |
|---|---|
| *G06F 18/40* | (2023.01) |
| *G06N 20/00* | (2019.01) |
| *G06T 3/4015* | (2024.01) |
| *G06T 3/4038* | (2024.01) |
| *G06T 5/20* | (2006.01) |
| *G06T 5/70* | (2024.01) |
| *H04N 23/81* | (2023.01) |
| *H04N 23/90* | (2023.01) |

(52) U.S. Cl.
CPC ........... *G06N 20/00* (2019.01); *G06T 3/4015* (2013.01); *G06T 3/4038* (2013.01); *G06T 5/20* (2013.01); *G06T 5/70* (2024.01); *G06T 7/90* (2017.01); *H04N 23/90* (2023.01); *G06T 2207/10016* (2013.01); *G06T 2207/10024* (2013.01); *G06T 2207/20081* (2013.01); *G06T 2207/20084* (2013.01); *G06T 2207/20182* (2013.01)

(58) Field of Classification Search
CPC ..... G06F 18/2148; G06F 18/40; G06N 20/00; G06N 3/045; G06N 3/088; G06T 3/4015; G06T 3/4038; G06T 5/20; G06T 5/70; G06T 7/90; G06T 2207/10016; G06T 2207/10024; G06T 2207/20081; G06T 2207/20084; G06T 2207/20182; G06T 3/40; G06T 5/60; G06T 5/90; G06V 10/30; G06V 10/56; G06V 10/774; G06V 10/82
USPC ........................................................ 382/254
See application file for complete search history.

(56) References Cited

U.S. PATENT DOCUMENTS

| | | | |
|---|---|---|---|
| 9,264,635 B2 | 2/2016 | Taguchi et al. | |
| 9,344,690 B2 | 5/2016 | Nowozin et al. | |
| 9,406,274 B2 | 8/2016 | Okumura | |
| 10,460,231 B2 | 10/2019 | Zhang et al. | |
| 10,643,306 B2 | 5/2020 | Hwang et al. | |
| 10,764,507 B1 | 9/2020 | Li et al. | |
| 11,085,823 B2 | 8/2021 | Ben-Shahar et al. | |
| 11,637,998 B1* | 4/2023 | Pieper | H04N 23/85 348/207.99 |
| 2015/0215590 A1 | 7/2015 | Nowozin et al. | |
| 2021/0067744 A1* | 3/2021 | Buibas | G06F 3/012 |
| 2021/0158096 A1* | 5/2021 | Sinha | G06N 3/08 |
| 2021/0281745 A1* | 9/2021 | Hibi | G06T 7/00 |
| 2022/0014447 A1* | 1/2022 | Kuo | G06N 3/047 |
| 2022/0116052 A1* | 4/2022 | Silberman | G07C 5/085 |
| 2022/0230216 A1* | 7/2022 | Buibas | G06V 10/454 |

FOREIGN PATENT DOCUMENTS

| | | |
|---|---|---|
| KR | 1020190100833 A | 8/2019 |
| KR | 1020190105273 A | 9/2019 |
| KR | 1020200058440 A | 5/2020 |
| WO | 2020/126023 A1 | 6/2020 |

OTHER PUBLICATIONS

Brooks, T., et al., "Unprocessing Images for Learned Raw Denoising", Computer Vision Foundation, Nov. 27, 2018, pp. 11036-11045.

Ignatov, A., et al., "Replacing Mobile Camera ISP with a Single Deep Learning Model", arXiv:2002.05509v1 [cs.CV], Feb. 13, 2020, 11 pages.

Ignatov, A., et al., "DSLR-Quality Photos on Mobile Devices with Deep Convolutional Networks", arXiv: 1704.02470v2 [cs.CV], Sept. 5, 2017, pp. 1-16.

Michaël Gharbi et al., "Deep Joint Demosaicking and Denoising", ACM Transactions on Graphics, vol. 35, Issue No. 6, Article No. 191, Nov. 11, 2016, pp. 1-12, DOI:10.1145/2980179.2982399.

Thibaud Ehret et al., "Joint Demosaicking and Denoising by Fine-Tuning of Bursts of Raw Images", 2019 2019 IEEE/CVF International Conference on Computer Vision (ICCV), Oct. 27, 2019, pp. 8867-8876, DOI: 10.1109/ICCV.2019.00896.

Extended European Search Report issued by the European Patent Office on Jan. 20, 2023 for European Patent Application No. 21790064.6.

Office Action dated Jan. 29, 2024, issued by Korean Patent Office in Korean Patent Application No. 10-2020-0149889.

* cited by examiner

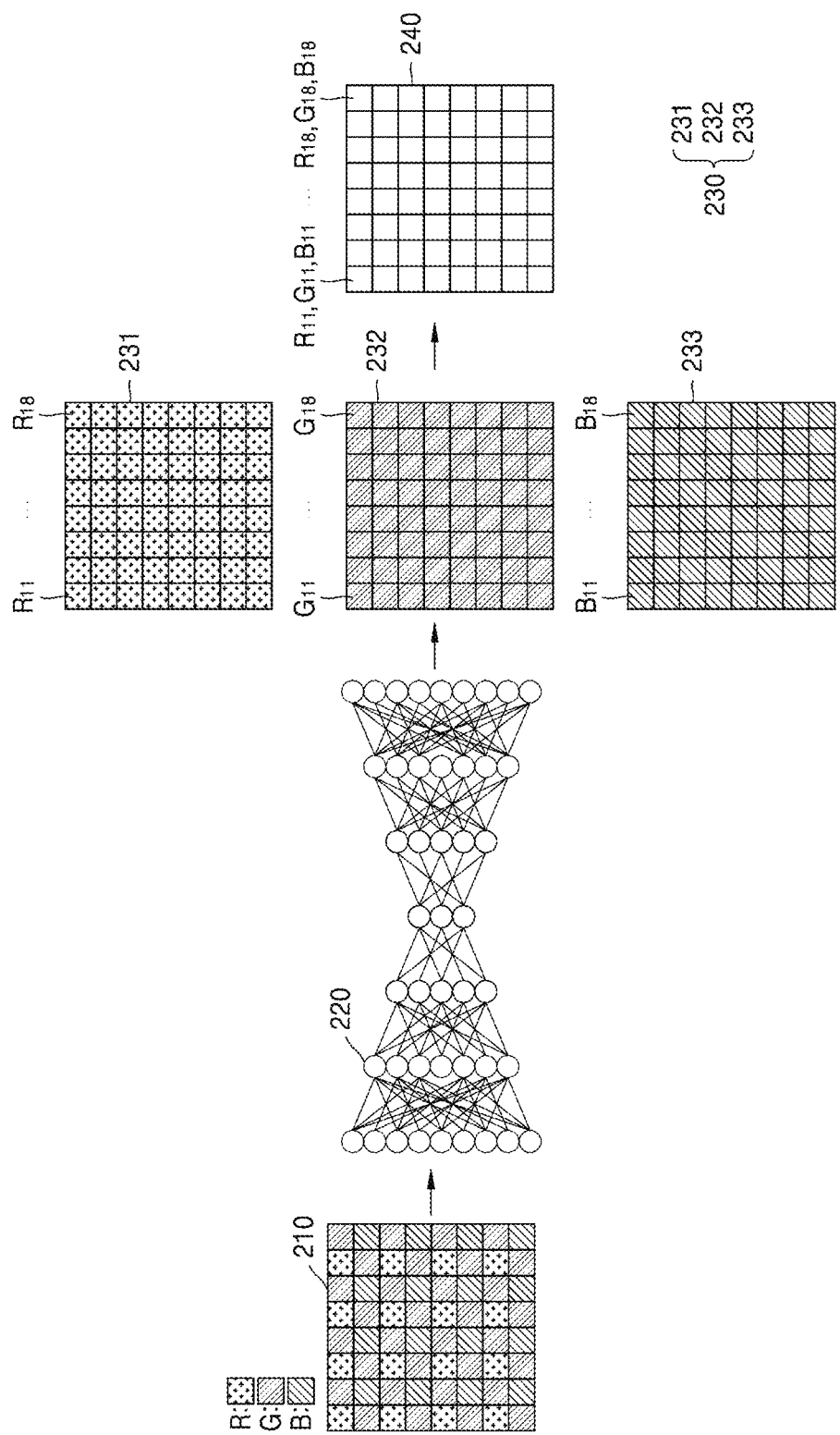

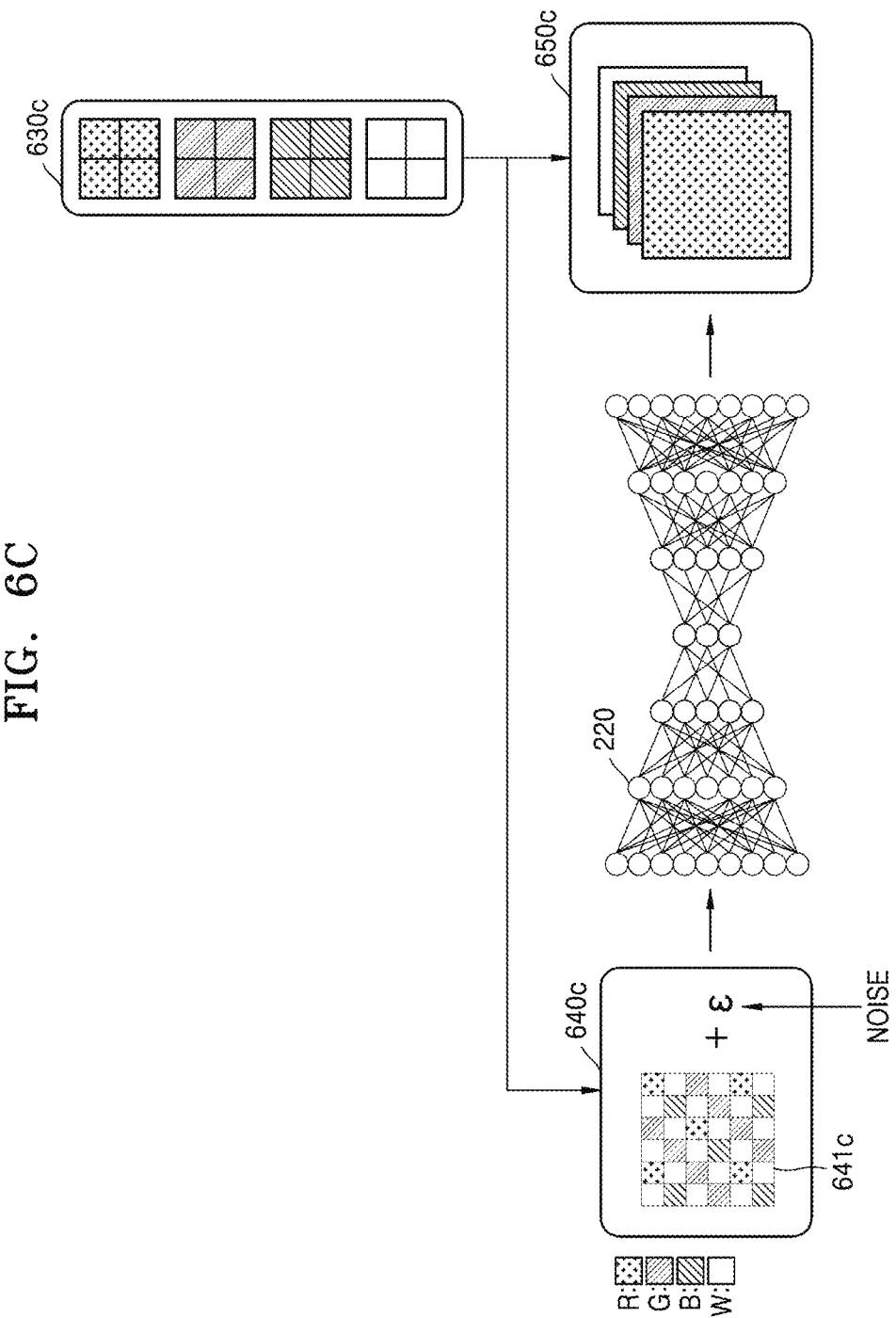

METHOD OF GENERATING NOISE-REDUCED IMAGE DATA AND ELECTRONIC DEVICE FOR PERFORMING THE SAME

CROSS-REFERENCE TO RELATED APPLICATIONS

This application is a Continuation Application of International Application PCT/KR2021/012433 filed on Sep. 13, 2021, which claims benefit of Korean Patent Application No. 10-2020-0140681, filed on Oct. 27, 2020, at the Korean Intellectual Property Office and Korean Patent Application No. 10-2020-0149889, filed on Nov. 11, 2020, at the Korean Intellectual Property Office, the disclosures of which are incorporated herein in their entireties by reference.

TECHNICAL FIELD

Embodiments of the disclosure relate to a method of generating noise-reduced image data and an electronic device for performing the same.

BACKGROUND ART

With the development of information technology (IT), various types of electronic devices such as smart phones, tablet personal computers (PCs), and the like are being widely supplied. In addition, such electronic devices may include one or more camera modules. The camera module may be implemented as a digital camera capable of converting light into an electrical image signal by using an image sensor rather than a traditional film camera, and storing the converted signal as image data.

Recently, with the development of integration technology and compression technology, the trend toward high-pixel resolution camera modules is prominent, and user demand for sharper and higher quality images is increasing.

DISCLOSURE

Technical Problem

In an ordinary camera module, an image signal processor (ISP) adjusts and processes thousands of ISP parameters, so as to generate image data from an electrical image signal obtained through an image sensor. The ISP may generate the image data by performing a plurality of linear image processing operations, for example, demosaicing, denoising, white balance adjustment, and the like, but when processing high-quality image data, a hardware or software burden of the ISP may be further increased. In addition, because an increase in the image processing rate may be limited in a certain hardware specification, it may be difficult to rapidly process high-quality image data.

Furthermore, the subjective preferences of users regarding images may greatly vary, but it may be technically difficult to adaptively adjust values of the thousands of ISP parameters according to the preferences of the users.

Technical Solution

According to an embodiment of the disclosure, disclosed is a method, performed by an electronic device including a camera module, of generating noise-reduced image data of object, the method including: obtaining, by a second processor of the electronic device, from a first processor of the electronic device, a control signal for obtaining image data; storing one learning model from among at least one learning model, into a memory; obtaining, by using the camera module, raw image data of the object obtained from light received by the camera module, the raw image data having a color array of a plurality of colors with respect to a plurality of pixels; obtaining, by using the stored one learning model, a color data set of the plurality of pixels from the obtained raw image data, the color data set comprising a plurality of pieces of color data classified according to the plurality of colors; and obtaining the noise-reduced image data of the object by using the obtained color data set. Advantageously, with the method of the disclosure, noise-reduced image data can be generated (or obtained) from raw image data (an image signal) without the need for an ISP. By using a learning model as specified below, the functionality of such ISP is provided by at least one learning model, which is further capable of reducing random noise such as shot noise or readout noise from the raw image data. Also, the at least one learning model may advantageously comprise multiple learning models, wherein individual learning models correspond to different user preferences, different environments for obtaining the raw image data and/or different hardware configurations.

According to another embodiment of the disclosure, disclosed is an electronic device for generating noise-reduced image data of an object, the electronic device including: a camera module; a first memory storing at least one learning model; a first processor electrically connected to the camera module and the first memory; and an artificial intelligence processing unit communicatively connected to the camera module and the first processor, and comprising a second processor and a second memory, wherein the first processor is configured to transmit, to the second processor, a control signal for obtaining image data, and the second processor is configured to, in response to obtaining the control signal, store one learning model from among the at least one learning model into the second memory, obtain, by using the camera module, raw image data of the object obtained from light received by the camera module, the raw image data having a color array of a plurality of colors with respect to a plurality of pixels, obtain, by using the one learning model stored into the second memory, a color data set of the plurality of pixels from the obtained raw image data, the color data set comprising a plurality of pieces of color data classified according to the plurality of colors, and obtain the noise-reduced image data of the object by using the obtained color data set. Advantageously, with the electronic device of the disclosure, noise-reduced image data can be generated (or obtained) from raw image data without the need for an ISP, as the ISP functionality is provided by at least one learning model as specified below, wherein the at least one learning model is also capable of reducing random noise from raw image data. Also, the at least one learning model may advantageously comprise multiple learning models, individual learning models corresponding to different user preferences, different environments for obtaining the raw image data and/or different hardware configurations.

Advantageous Effects

According to embodiments of the disclosure, it is possible to enable faster and more adaptive image processing by performing nonlinear image processing. It is also possible to provide a user with image data having higher image quality by more efficiently performing noise reduction processing. It is also possible to increase user satisfaction with image data by enabling image processing according to the subjective preference of a user. In addition to the effects described above, various effects directly or indirectly achieved throughout the disclosure may be provided.

DESCRIPTION OF DRAWINGS

FIG. 2 is a diagram illustrating a method, performed by an electronic device, of performing image processing for generating noise-reduced image data by using a learning model, according to an embodiment of the disclosure.

FIG. 6C is a diagram illustrating input data to be input to a learning model for image processing, and target data, according to another embodiment of the disclosure.

In relation to explanation of the drawings, same or similar reference numerals may be used for same or similar elements.

MODE FOR INVENTION

Figure 1A:
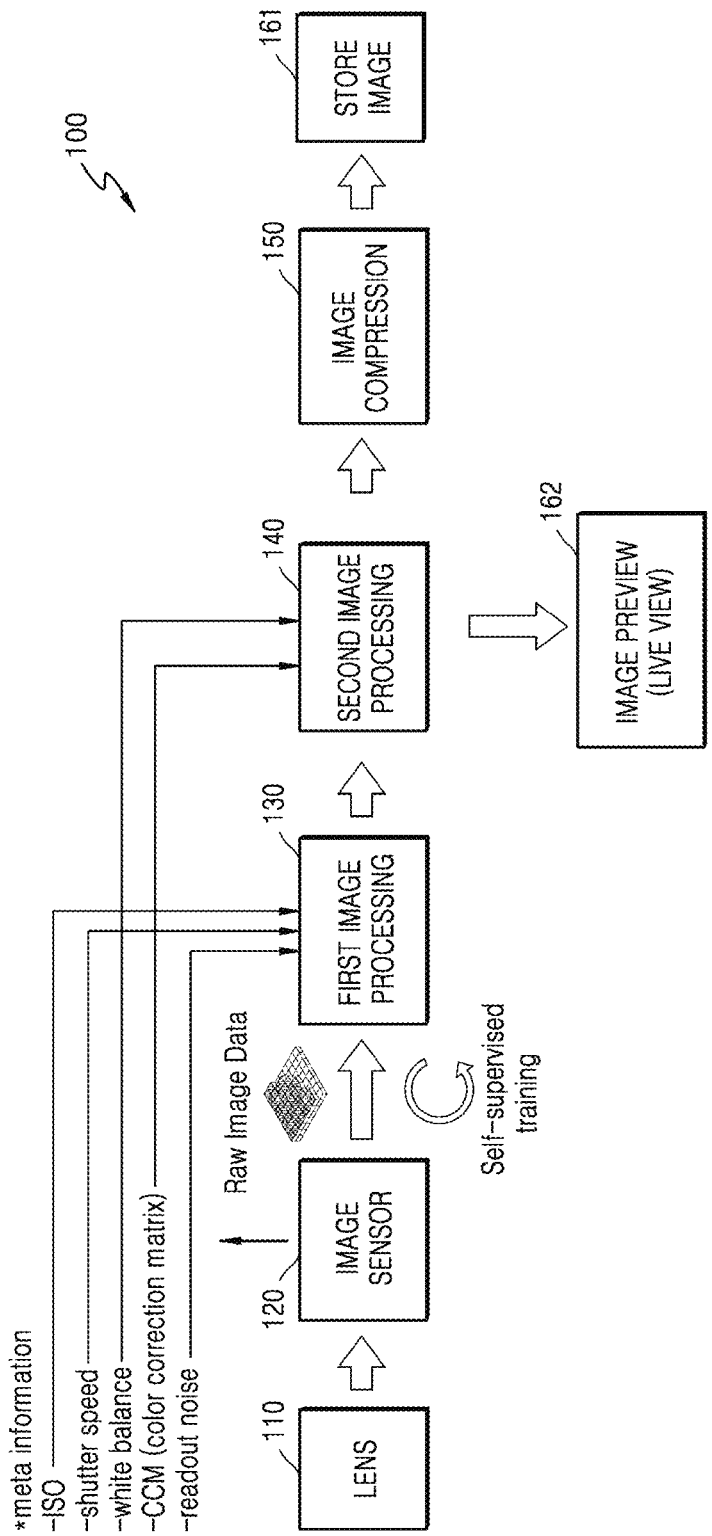
FIG. 1A is a diagram illustrating a process, performed by an electronic device, of generating noise-reduced image data of an object, according to an embodiment of the disclosure.

Prior to the detailed description of the disclosure, the terms used in the specification may be defined or understood as follows.

Throughout the specification, the term "raw image data" may be understood as data that indicates intensities of light received by a plurality of pixels, the intensities being detected by using a light-receiving sensor after the light passes through color filters corresponding to the pixels, respectively. The raw image data may have a specified pattern based on a pattern of a color filter array consisting of a plurality of types of color filters, and may be understood as data that is not demosaiced. In various embodiments of the disclosure, the raw image data having the specified pattern may contain a single color value corresponding to a certain color filter for each of the plurality of pixels. Demosaicing may refer to a process of estimating or calculating, with respect to each of the plurality of pixels, color values corresponding to color filters other than the certain color filter, so as to calculate actual color values of an object, respectively corresponding to the plurality of pixels. In various embodiments of the disclosure, a process of converting each of the actual color values of the object into a single color value corresponding to a certain color filter, i.e., a process of reversely performing the demosaicing, may be understood as mosaicing. Captured by the light-receiving sensor, the object may refer to individual elements or parts of a scene captured by the light-receiving sensor, or may refer to the entirety of the scene captured by the light-receiving sensor.

Also, throughout the specification, the term "sample raw image data" may be understood as raw image data of a sample image to be used for training at least one learning model. In addition, throughout the specification, the term "training raw image data" may be understood as raw image data that is re-mosaiced (mosaiced) by using standard color data sets obtained by down-sampling sample raw image data. Therein, the mosaicing may comprise up-sampling the standard color data sets. The up-sampling may be performed by one or more of transposed convolution, deconvolution, and fractionally-strided convolution. When de-mosaicing comprises using a convolution matrix of size (X,Y), mosaicing may comprise using of a matrix with the size (Y,X) of the transposed convolution matrix. Up-sampling may also comprise resizing the standard color data sets, e.g., using interpolation, and subsequent convolution (resize-convolution). The resolution of the training raw image data may be less than or equal to the resolution of the sample raw image data. Also, throughout the specification, the term "retraining raw image data" may be understood as raw image data with respect to retraining sample image data.

Throughout the specification, the term "color data set" may refer to data obtained by inputting raw image data to the at least one learning model, and the color data set may include a plurality of pieces of color data determined according to a color filter array used. Each of the plurality of pieces of color data may indicate pixel values for a single color component, with respect to each of a plurality of pixels. There may be a corresponding piece of color data for each color (single color component) present in the used color filter array. Hence, the types and number of the plurality of pieces of color data included in the color data set are determined based on the specified color array of the raw image data. In addition, throughout the specification, the term "standard color data set" may refer to a color data set obtained by down-sampling sample raw image data, and the standard color data set may be a standard of input data to be input to the at least one learning model, and target data. In addition, throughout the specification, the term "retraining standard color data set" may be understood as a standard color data set obtained from retraining sample image data.

Throughout the specification, the term "input data" may be understood as data to be input to the at least one learning model. Also, throughout the specification, the term "output data" may be understood as data output from the at least one learning model in response to the input data. In addition, throughout the specification, the term "target data" may be understood as data that is a target that the output data, which is output from the at least one learning model in response to the input data, is to be. The at least one learning model may be trained to increase the similarity between the output data and the target data. Also, throughout the specification, the terms "retraining input data" and "retraining target data" may be understood as input data to be input in a process of retraining the at least one learning model, and target data, respectively.

Throughout the specification, the term "pixel value" may be understood as a color value corresponding to each pixel, in data (e.g., raw image data, color data, image data, etc.) with respect to a plurality of pixels consisting of N rows and M columns. The pixel value may include color values with respect to the plurality of colors determined according to the color filter array used. For example, when a Bayer pattern is used for the color filter array, the pixel value may include color values with respect to red, green, and blue colors. In addition, throughout the specification, with respect to a plurality of pixels consisting of N rows and M columns with the origin being at an upper-leftmost element, a pixel at the n-th row and the m-th column may be represented by 'pixel (n, m)'. In color data with respect to a red color, a pixel value of a pixel (n, m) may be represented by, for example, '(Rnm)', and in raw image data having a Bayer pattern, a pixel value of a pixel (n, m) may be represented by, for example, '(Rnm, Gnm, Bnm)'.

Throughout the specification, the term "image data" may refer to data on which image processing has been performed, and may be understood as data for an image displayed on a display of an electronic device. The image data may include pixel values with respect to a plurality of pixels, respectively.

FIG. 1A is a diagram illustrating a process 100, performed by an electronic device, of generating noise-reduced image data of an object, according to an embodiment of the disclosure.

Referring to FIG. 1A, the process 100, performed by the electronic device, of generating the noise-reduced image data of the object may include a plurality of operations, and each operation may be expressed as a block. According to various embodiments of the disclosure, the process 100, performed by the electronic device, of generating the noise-reduced image data of the object is not limited to that illustrated in FIG. 1A. For example, the process 100 may further include an operation that is not illustrated in FIG. 1A, or may omit any one of the operations illustrated in FIG. 1A. Further, the description of one or more operation(s) as illustrated in FIG. 1A may apply generally to a method of the present disclosure, independently of the description of one or more other operation(s) as illustrated in and described with respect to FIG. 1A.

According to an embodiment of the disclosure, the electronic device may receive, by using a lens 110, light emitted from or reflected by the object. The light may include components having different wavelengths based on the colors of the object. According to various embodiments of the disclosure, the lens 110 of the electronic device may include one or more lenses. For example, the lens 110 of the electronic device may include one or more types of lenses among a standard lens, a wide-angle lens, a telephoto lens, a fish-eye lens, a micro lens, and a zoom lens, based on a focal length and the like. A user of the electronic device may select any one lens from among the one or more lenses of the lens 110 according to the purpose of image capture, and the electronic device may receive, by using the selected lens 110, the light emitted from or reflected by the object. The multiple lenses of the one or more lenses may be aligned along the same optical axis or may be disposed on different optical axes which may be parallel in one embodiment and not parallel in another embodiment.

According to an embodiment of the disclosure, the light entering the electronic device through the lens 110 may be converted into an electrical image signal by using an image sensor 120. In various embodiments of the disclosure, the image sensor 120 may include a charge-coupled device (CCD) sensor or a complementary metal-oxide semiconductor (CMOS) sensor, and may include a color filter array (CFA) consisting of a plurality of types of color filters. Where there are multiple lenses, there may be the image sensor 120 may include a corresponding number of multiple sensors, depending on the arrangement of the multiple lenses.

According to an embodiment of the disclosure, the image sensor 120 may generate raw image data based on the converted electrical image signal. In an embodiment of the disclosure, the image sensor 120 may convert only a component corresponding to a specified wavelength range in the received light, into the electrical image signal, received at the plurality of pixels. For example, with respect to a first pixel, the image sensor 120 may convert only a component in a first wavelength range, for example, a wavelength range corresponding to a red color, in the received light, into the electrical image signal. As another example, with respect to a second pixel, the image sensor 120 may convert only a component in a second wavelength range, for example, a wavelength range corresponding to a green color, in the received light, into the electrical image signal. As another example, with respect to a third pixel, the image sensor 120 may convert only a component in a third wavelength range, for example, a wavelength range corresponding to a blue color, in the received light, into the electrical image signal.

According to an embodiment of the disclosure, the wavelength range of a component to be converted into an electrical image signal with respect to each pixel may be based on the specified pattern of the color filter array, and accordingly, the raw image data having a plurality of pixels may be in a form of the specified pattern. According to various embodiments of the disclosure, the specified pattern may be any one of a Bayer pattern, a red-green-blue-emerald (RGBE) pattern, a red-yellow-yellow-blue (RYYB) pattern, a cyan-yellow-yellow-magenta (CYYM) pattern, a cyan-yellow-green-magenta (CYGM) pattern, a red-green-blue-white (RGBW) Bayer pattern, and an X-Trans pattern, and may have a pattern that is not listed above.

According to an embodiment of the disclosure, the image sensor 120 may obtain meta information related to the raw image data. The meta information may include, for example, information regarding a surrounding environment at a point of time when image data of an object is obtained, or configuration values of a camera. For example, the meta information may include at least one of International Organization for Standardization (ISO) information, a shutter speed value, a white balance value, color correction matrix information, or readout noise information. The ISO information may indicate the sensitivity to light of the image sensor 120, the shutter speed value may mean the length of time that the shutter of the camera is open, and the white balance value may be a value for adjusting a color temperature of light. The color correction matrix information may be understood as information for correcting a difference between an actual color of the object and a color in the raw image data, and the readout noise information may be understood as information about noise that may occur due to heat or a current of a dark area of the image sensor 120.

According to an embodiment of the disclosure, when the raw image data is generated by the image sensor 120, first image processing 130 may be performed on the raw image data. According to an embodiment of the disclosure, the first image processing 130 may include demosaicing and/or denoising. In an embodiment, demosaicing may be understood as a process of calculating, with respect to each of the plurality of pixels included in the raw image data, actual color values of the object from a color value corresponding to any one of a plurality of color filters. In an embodiment, denoising may be understood as a process of removing noise that may be included in the raw image data. According to various embodiments of the disclosure, the first image processing 130 may be understood as performing the demosaicing and/or the denoising by using at least one learning model.

According to an embodiment of the disclosure, the raw image data generated by the image sensor 120 may be used for training (self-supervised training) of the at least one learning model for performing the first image processing 130, for example, the demosaicing and/or the denoising. For example, input data and target data to be used for the at least one learning model for performing the demosaicing and/or the denoising to perform the self-supervised training may be obtained based on the raw image data.

According to an embodiment of the disclosure, at least part of the meta information obtained by the image sensor 120 may be used for training the at least one learning model. In an embodiment of the disclosure, the ISO information, the shutter speed value, and the readout noise information in the meta information may be information related to noise included in the raw image data. The information related to the noise may be input to the at least one learning model, to be used to train the at least one learning model to perform the denoising. In various embodiments of the disclosure, the at least one learning model may be understood as an artificial intelligence model (or machine learning model), and the training of the at least one learning model will be described in more detail with reference to FIG. 3. According to an embodiment of the disclosure, at least part of the meta information obtained by the image sensor 120 is subsequently used for selecting at least one trained learning model.

According to an embodiment of the disclosure, after the first image processing 130 is performed on the raw image data, second image processing 140 may be performed on the raw image data on which first image processing 130 was performed. According to an embodiment of the disclosure, the second image processing 140 may include white balancing, color space transformation, and/or gamma correction. The white balancing may be understood as a process of adjusting a color temperature of light, the color space transformation may be understood as conversion between pieces of data represented by different color spaces, and the gamma correction may be understood as a process of nonlinearly transforming an intensity signal of light by using a nonlinear transfer function. According to an embodiment of the disclosure, at least part of the meta information obtained by the image sensor 120 may be used for the second image processing 140. For example, the white balance value and a color correction matrix may be used for an operation of performing the second image processing 140.

According to an embodiment of the disclosure, the electronic device may provide the user with an image of the object as a image preview or live view 162, and may store the image in the form of captured image data (see reference numeral 161 of FIG. 1A). For example, the electronic device may operate a camera application to capture an image of an object, and may display an image of the object in the form of the image preview or live view 162 on a display. As another example, the electronic device may operate the camera application to capture an image of an object, and may store the image in the form of captured image data in response to a user input for image capture (see reference numeral 161 of FIG. 1A).

According to an embodiment of the disclosure, the image preview or live view 162 of the image may be provided by displaying, on the display, data on which the first image processing 130 and the second image processing 140 are performed as illustrated in FIG. 1A, or by displaying, on the display, data on which only the first image processing 130 is performed unlike as illustrated in FIG. 1A. According to another embodiment of the disclosure, unlike as illustrated in FIG. 1A, the image preview or live view 162 of the image may be provided in a manner that, after the first image processing 130 and the second image processing 140 are performed, data on which additional image processing is performed is displayed on the display.

According to an embodiment of the disclosure, the storing of the image (see reference numeral 161 of FIG. 1A) may be performed by displaying data on the display, the data being obtained as a result of performing image compression 150 on the data on which the first image processing 130 and the second image processing 140 are performed. The image compression 150 may be understood as an operation of compressing the data on which the first image processing 130 and the second image processing 140 are performed, at a specified compression ratio. In various embodiments of the disclosure, the specified compression ratio may be selected based on a configuration of the electronic device or a user configuration. According to various embodiments of the disclosure, unlike as illustrated in FIG. 1A, the storing of the image (see reference numeral 161 of FIG. 1A) may be performed by performing the image compression 150 on the data on which the additional image processing is performed after the first image processing 130 and the second image processing 140 are performed, and then displaying the data on the display.

Figure 1B:
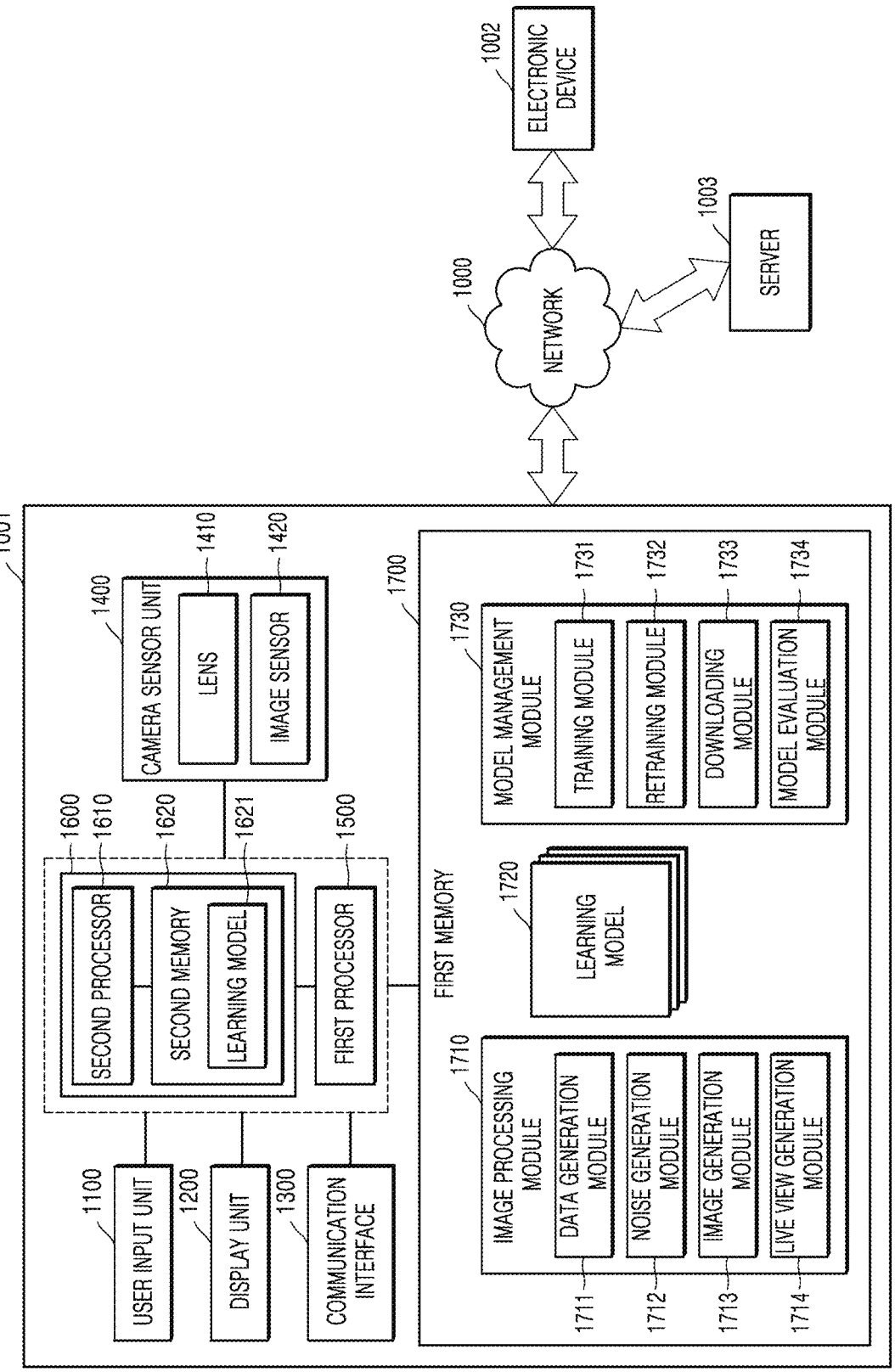
FIG. 1B is a block diagram of an electronic device, according to an embodiment of the disclosure.

FIG. 1B is a block diagram of an electronic device 1001, according to an embodiment of the disclosure.

Referring to FIG. 1B, the electronic device 1001 may include a user input unit 1100, a display unit 1200, a communication interface 1300, a camera sensor unit 1400, a first processor 1500, an artificial intelligence (AI) processing unit 1600, and a first memory 1700, and the AI processing unit 1600 may include a second processor 1610 and a second memory 1620. According to an embodiment of the disclosure, the first processor 1500 and the AI processing unit 1600 may be referred to as at least one processor and thus, may be understood as one configuration that controls the operations of other components of the electronic device 1001. In one embodiment, the first processor 1500 and the AI processing unit 1600 are on different dies or on different packages. In another embodiment, the first processor 1500 and the AI processing unit 1600 are on the same die or on the same package. According to various embodiments of the disclosure, the configuration of the electronic device 1001 is not limited to that illustrated in FIG. 1B, and may further include a configuration (component) not illustrated in FIG. 1B, or may omit some components of the configuration illustrated in FIG. 1B. For example, the electronic device 1001 may further include a separate processor (e.g., on a separate die or package), for example, a neural processing unit (NPU), for an artificial intelligence model, for example, at least one learning model 1720 or 1621. As another example, at least part of an image processing module 1710 or a model management module 1730 included in the first memory 1700 may be implemented as a separate hardware module, rather than a software module stored in the first memory 1700. Thus, the description of one or more component(s) as illustrated in FIG. 1B may apply generally to an electronic device 1001 of the disclosure, independently of the description of one or more other component(s) as illustrated in and described with respect to FIG. 1B.

The user input unit 1100 may refer to a unit via which a user inputs data for controlling the electronic device 1001. For example, the user input unit 1100 may include, but is not limited to, at least one of a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, or a piezo effect-type touch pad), a jog wheel, or a jog switch. The user input unit 1100 may receive a user input for image capture from the user of the electronic device 1001.

The display unit 1200 may display and output information processed by the electronic device 1001. For example, the display unit 1200 may display a graphical user interface (GUI) for image capture, a preview image, a live view image, and an image that is output as a result of image capture.

The communication interface 1300 may support establishment of a wired or wireless communication channel between the electronic device 1001 and an external electronic device 1002 (hereinafter, also referred to as the other electronic device 1002) or a server 1003, and may support communication via the established communication channel. According to an embodiment of the disclosure, the communication interface 1300 may perform wired communication or wireless communication to receive data from the external electronic device 1002 or the server 1003, or transmit data to the external electronic device 1002 or the server 1003. According to various embodiments of the disclosure, the communication interface 1300 may include a wireless communication module (e.g., a cellular communication module, a short-range wireless communication module, or a global navigation satellite system (GNSS) communication module) or a wired communication module (e.g., a local area network (LAN) communication module, or a power line communication module), and may communicate, by using any one communication module, with the external electronic device 1002 or the server 1003 through at least one network 1000, for example, a short-range communication network (e.g., Bluetooth, Wi-Fi direct, or Infrared Data Association (IrDA)) or a long-range communication network (e.g., a cellular network, Internet, or a computer network (e.g., LAN or WAN)).

In an embodiment, the communication interface 1300 may support direct communication with the external electronic device 1002 or the server 1003 through the protocols listed above wherein the electronic device 1001 and the external electronic device 1002 or the server 1003 form the network.

The camera sensor unit 1400 may be understood as a component identical or similar to a camera or a camera module for obtaining an image. In an embodiment of the disclosure, the camera sensor unit 1400 may include a lens 1410 and an image sensor 1420. According to various embodiments of the disclosure, one or more camera sensor units 1400 may be provided according to a function or purpose. For example, the camera sensor unit 1400 may include a first camera sensor unit including a wide-angle lens and a second camera sensor unit including a telephoto lens. In various embodiments of the disclosure, the description of the lens 110 illustrated in FIG. 1A is identically or similarly applicable to the lens 1410, and the description of the image sensor 120 illustrated in FIG. 1A is identically or similarly applicable to the image sensor 1420.

According to an embodiment of the disclosure, the camera sensor unit 1400 may operate under control by the first processor 1500 or the second processor 1610. For example, the camera sensor unit 1400 may perform an operation of capturing an image of an object under the control by the first processor 1500. As another example, the camera sensor unit 1400 may perform an operation of capturing an image of an object under the control by the second processor 1610 based on a control signal of the first processor 1500, or under independent control by the second processor 1610.

According to an embodiment of the disclosure, the camera sensor unit 1400 may operate under the control by the first processor 1500 or the second processor 1610, to obtain raw image data. For example, a data generation module 1711 stored in the first memory 1700 may be executed by the first processor 1500, and the data generation module 1711 may generate the raw image data by using the camera sensor unit 1400. As another example, the data generation module 1711 stored in the first memory 1700 may be loaded or stored into the second memory 1620, and in this case, the data generation module 1711 may be executed by the second processor 1610 to generate the raw image data by using the camera sensor unit 1400.

The first processor 1500 may be electrically or communicatively connected to the components included in the electronic device 1001, to perform operations or data processing related to control and/or communication of the components included in the electronic device 1001. According to an embodiment of the disclosure, the first processor 1500 may load or store a command or data received from at least one of other components into the first memory 1700 to process the command or data, and may store result data in the first memory 1700. According to various embodiments of the disclosure, the first processor 1500 may include at least one of a central processing unit (CPU), an application processor (AP), a graphics processing unit (GPU), a neural processing unit (NPU), etc.

According to an embodiment of the disclosure, the first processor 1500 may transmit a control signal to the second processor 1610 to cause the second processor 1610 to execute one or more modules to perform one or more image processing operations on the raw image data obtained by using the camera sensor unit 1400. According to an embodiment of the disclosure, the first processor 1500 may transmit a control signal to the second processor 1610 to cause the second processor 1610 to execute one or more modules to perform training or application of the at least one learning model 1621.

According to an embodiment of the disclosure, the first processor 1500 may load or store, into the second memory 1620, one or more modules or any one learning model (e.g., learning model 1621) from among the at least one learning model 1720 stored in the first memory 1700, such that the second processor 1610 may execute the one or more modules or any one learning model. For example, the first processor 1500 may load the any one learning model into the second memory 1620 such that the second processor 1610 may perform an operation on the any one learning model 1621 from among the at least one learning model 1720 stored in the first memory 1700. In various embodiments of the disclosure, the loading or storing, by the first processor 1500, of the one or more modules or the any one learning model 1621 into the second memory 1620 may be understood as an operation of transmitting the one or more modules or the any one learning model 1621 to the AI processing unit 1600.

The AI processing unit 1600 is a component for controlling the camera sensor unit 1400 and performing training and application of the at least one learning model 1621, and may include the second processor 1610 and the second memory 1620. According to an embodiment of the disclosure, the AI processing unit 1600 may be understood as a dedicated processing unit for performing image processing by using the at least one learning model 1621 using AI technology, and the second processor 1610 may be understood as a dedicated processor for performing image processing by using the at least one learning model 1621. According to an embodiment of the disclosure, unlike as illustrated in FIG. 1B, the AI processing unit 1600 may be a component included in the first processor 1500, or may be implemented as part of an NPU (not shown) which is an AI-dedicated processor such as an AI accelerator ASIC. In embodiments, the AI processing unit may be one of a tensor processing unit, a neural network processor, a graphics processing unit, an intelligence processing unit, a vision processing unit, a central processing unit, etc.

According to an embodiment of the disclosure, the second processor 1610 may perform, alone or in response to a control signal from the first processor 1500, processing of data generated by using the camera sensor unit 1400, for example, raw image data, sample raw image data, a standard color data set, input data, or output data generated or obtained by the data generation module 1711. The data processed by the second processor 1610 is not limited to the above-listed examples, and may include all data generated or obtained in a process of generating an image corresponding to an object.

According to an embodiment of the disclosure, the second processor 1610 may perform, alone or in response to a control signal from the first processor 1500, training, retraining, downloading, evaluation, or application of the at least one learning model 1621. In various embodiments of the disclosure, after the any one learning model 1621 from among the at least one learning model 1720 stored in the first memory 1700 is loaded or stored into the second memory 1620, the second processor 1610 may perform training, retraining, evaluation, or application of the any one learning model 1621.

The second memory 1620 may store one or more modules for processing and control by the second processor 1610, the learning model 1621, programs, instructions, or data. For example, the second memory 1620 may store the any one learning model 1621 from among the at least one learning model 1720 stored in the first memory 1700, and the learning model 1621 stored in the second memory 1620 may be executed by the second processor 1610. In various embodiments of the disclosure, the second memory 1620 may include at least one of a flash memory-type storage medium, a hard disk-type storage medium, a multimedia card micro-type storage medium, card-type memory (e.g., SD or XD memory), random access memory (RAM), static random-access memory (SRAM), read-only memory (ROM), electrically erasable programmable read-only memory (EEPROM), programmable read-only memory (PROM), magnetic memory, a magnetic disc, an optical disc, etc.

The first memory 1700 may be electrically or communicatively connected to the first processor 1500, and may store one or more modules related to the operations of the components included in the electronic device 1001, the at least one learning model 1720, programs, instructions, or data. According to an embodiment of the disclosure, the first memory 1700 may include the image processing module 1710, the at least one learning model 1720, and the model management module 1730. The first memory 1700 may include at least one of a flash memory-type storage medium, a hard disk-type storage medium, a multimedia card micro-type storage medium, card-type memory (e.g., SD or XD memory), random access memory (RAM), static random-access memory (SRAM), read-only memory (ROM), electrically erasable programmable read-only memory (EEPROM), programmable read-only memory (PROM), magnetic memory, a magnetic disc, an optical disc, etc.

The image processing module 1710 may be understood as a module for performing an operation related to image processing of the raw image data obtained by using the camera sensor unit 1400. In an embodiment of the disclosure, the image processing module 1710 may include the data generation module 1711, a noise generation module 1712, an image generation module 1713, and a live view generation module 1714.

The data generation module 1711 may be executed by the first processor 1500 or by the second processor 1610 in response to a control signal of the first processor 1500, to obtain data to be input to the at least one learning model 1720 or 1621 for noise reduction of the raw image data. For example, the data generation module 1711 may obtain input data and target data. As another example, the data generation module 1711 may obtain a standard color data set and training raw image data for obtaining the input data and the target data. As another example, the data generation module 1711 may obtain retraining input data and retraining target data for retraining the at least one learning model 1720 or 1621.

In an embodiment of the disclosure, the data generation module 1711 may obtain sample raw image data from, for example, the camera sensor unit 1400, the other electronic device 1002, or the server 1003, and may obtain the standard color data set by applying a down-sampling filter to the sample raw image data. In an embodiment of the disclosure, the data generation module 1711 may obtain the target data by using the standard color data set, and may obtain the training raw image data by using the standard color data set. In an embodiment of the disclosure, the data generation module 1711 may obtain the input data by combining the training raw image data with random noise generated by the noise generation module 1712. In various embodiments of the disclosure, various types of data obtained by the data generation module 1711 in various embodiments of the disclosure will be described in more detail with reference to FIGS. 3, 6A to 6C, 7A to 7C, and 8.

The noise generation module 1712 may be executed by the first processor 1500 or by the second processor 1610 in response to a control signal of the first processor 1500, to generate the random noise. In various embodiments of the disclosure, the random noise may be generated by considering a shot noise related to nonuniformity of the amount of incident photons, or a readout noise that may occur when the image sensor 1420 obtains the amount of received light. According to an embodiment of the disclosure, the generation range for the random noise may be set in advance. The noise generation module 1712 may generate the random noise by selecting an arbitrary value within the generation range. In an embodiment of the disclosure, the noise generation module 1712 may be understood to be the same as or similar to a noise generator. In various embodiments of the disclosure, the random noise generated by the noise generation module 1712 in various embodiments of the disclosure will be described in more detail with reference to FIG. 3.

The image generation module 1713 may be executed by the first processor 1500 or by the second processor 1610 in response to a control signal of the first processor 1500 to obtain and store noise-reduced image data of the object. For example, the image generation module 1713 may obtain a color data set by inputting the raw image data obtained from the data generation module 1711 to any one of the at least one learning model 1720 or 1621, and obtain and store the noise-reduced image data based on the color data set. In an embodiment of the disclosure, the image generation module 1713 may perform image processing operations that end with the storing of the image as illustrated in 161 of FIG. 1A.

The live view generation module 1714 may be executed by the first processor 1500 or by the second processor 1610 in response to the control signal of the first processor 1500, to obtain a noise-reduced live view image or preview image of the object and display it by using the display unit 1200. For example, the live view generation module 1714 may obtain the color data set by inputting the raw image data obtained from the data generation module 1711 to any one of the at least one learning model 1720 or 1621, obtain the noise-reduced live view image or preview image based on the color data set, and display it by using the display unit 1200. In an embodiment of the disclosure, the live view generation module 1714 may perform image processing operations that end with the providing of the image preview or live view 162 of FIG. 1A.

As will be described below with reference to FIG. 3, the at least one learning model 1720 or 1621 may be understood as at least one model that is trained based on a plurality of sample images and that is based on at least one neural network. In various embodiments of the disclosure, the at least one neural network may include, but is not limited to, a deep neural network (DNN), an artificial neural network (ANN), a convolutional neural network (CNN), a recurrent neural network (RNN), etc. According to an embodiment of the disclosure, the at least one learning model 1720 or 1621 may have a noise reduction effect.

According to an embodiment of the disclosure, the at least one learning model 1720 or 1621 may be classified according to various attributes related to an image, and the classified at least one learning model 1720 or 1621 may be stored in the first memory 1700. According to various embodiments of the disclosure, the various attributes for classifying the at least one learning model 1720 or 1621 may include a filter applied to an image, a camera (lens) used for image capture, a vendor (manufacturer) of the image sensor 1420, a type (model) of the electronic device 1001, an image capture environment, characteristics of a captured object, or a combination thereof.

For example, the at least one learning model 1720 or 1621 may be classified according to an image filter having a certain correction effect on an image. For example, a first learning model may be trained based on images to which an unsharp mask filter is applied, a second learning model may be trained based on images to which a contrast adjustment mask filter is applied, and a third learning model may be trained based on images to which a warm tone emphasis filter is applied. The first learning model, the second learning model, and the third learning model may be stored in the first memory 1700, and the any one learning model 1621 based on a selection by the user from among them may be loaded or stored into the second memory 1620 to be applied to the raw image data.

As another example, the learning models may be classified according to the camera (lens) used for image capture. For example, the first learning model may be trained based on images captured by using a first camera including a telephoto lens, and the second learning model may be trained based on images captured by using a second camera including a wide-angle lens. The first learning model and the second learning model may be stored in the first memory 1700, and the any one learning model 1621 based on the user's selection or based on the lens used for image capture from among them may be loaded or stored into the second memory 1620 to be applied to the raw image data.

As another example, similar to the above examples, the at least one learning model 1720 or 1621 may be classified into learning models of different vendors, may be classified into learning models of different types of the electronic device 1001 (e.g., Galaxy S10 or Galaxy S20), may be classified into learning models with different image capture environments (e.g., different illuminances), or may be classified into learning models according to different types of captured objects (e.g., a person or a landscape). Alternatively, the at least one learning model 1720 or 1621 may be classified according to a combination of some of the attributes described above.

According to an embodiment of the disclosure, the at least one learning model 1720 or 1621 may be classified based on the user's configuration. For example, the first learning model may be trained based on images of a first group selected by the user, and the second learning model may be trained based on images of a second group selected by the user. The various examples for classification of the at least one learning model 1720 or 1621 advantageously allow to consider different hardware constraints, object properties, image properties, environments, user preferences, user inputs and/or user configurations when generating noise-reduced image data with respect to an object using the at least one learning model 1720 or 1621. According to various embodiments of the disclosure, some of the at least one learning model 1720 or 1621 may be trained directly by the electronic device 1001, and the others may be trained by the server 1003 or the other electronic device 1002 and then downloaded by the electronic device 1001.

According to an embodiment of the disclosure, the at least one learning model 1720 or 1621 may include different layer structures (network structures) and different weight information. For example, the first learning model and the second learning model may have different layer structures, and, even in the case where the first learning model and the second learning model have the same layer structure, they may have different weight information for each layer. For example, a single image with respect to input data and target data may be input to the first learning model at every repeating training cycle, and a plurality of images with respect to input data or target data may be input to the second learning model at once at every repeating training cycle. The second learning model to which a plurality of images are input at once may have a more complicated layer structure and a larger number of layers compared with the first learning model to which a single image is input. In various embodiments of the disclosure, the storing or loading of the at least one learning model 1720 or 1621, in the first memory 1700 or into the second memory 1620 may be understood as storing or loading of the layer structures and the weight information of the at least one learning model 1720 or 1621, in the first memory 1700 or into the second memory 1620.

The model management module 1730 may be understood as a module for performing an operation related to management of the at least one learning model 1720 or 1621. In an embodiment of the disclosure, the model management module 1730 may include a training module 1731, a retraining module 1732, a downloading module 1733, and a model evaluation module 1734.

The training module 1731 may be executed by the first processor 1500 or by the second processor 1610 in response to a control signal of the first processor 1500, to perform training of the at least one learning model 1720 or 1621. For example, the training module 1731 may perform the training of the at least one learning model 1720 or 1621 by inputting the input data and the target data obtained by the data generation module 1711 to the at least one learning model 1720 or 1621. The training of the at least one learning model 1720 or 1621 in various embodiments of the disclosure will be described in detail with reference to FIGS. 3, 6A to 6C, and 7A to 7C.

The retraining module 1732 may be executed by the first processor 1500 or by the second processor 1610 in response to a control signal of the first processor 1500, to perform retraining of the at least one learning model 1720 or 1621. For example, the retraining module 1732 may perform, based on a user input, the retraining of the at least one learning model 1720 or 1621 on which the training is completely performed, and may perform, based on a control signal obtained from the server 1003 or the other electronic device 1002, the retraining of the at least one learning model 1720 or 1621 on which the training is completely performed. In an embodiment of the disclosure, the retraining module 1732 may perform the retraining by inputting the retraining input data and the retraining target data to the at least one learning model 1720 or 1621 on which the training is completely performed. In various embodiments of the disclosure, the retraining input data and the retraining target data may be manually selected or automatically generated based on the user's selection, or may be obtained from the server 1003 or the other electronic device 1002. In various embodiments of the disclosure, the retraining of the at least one learning model 1720 or 1621 according to various embodiments of the disclosure will be described in detail with reference to FIG. 8.

The downloading module 1733 may be executed by the first processor 1500 or by the second processor 1610 in response to a control signal of the first processor 1500, to download the at least one learning model 1720 or 1621 from the server 1003 or the other electronic device 1002. According to an embodiment of the disclosure, the at least one learning model 1720 or 1621 to be downloaded may have been trained by the server 1003 or the other electronic device 1002. For example, the at least one learning model 1720 or 1621 may be trained by using images stored in the server 1003 or the other electronic device 1002 or images transmitted from the electronic device 1001. According to an embodiment of the disclosure, the at least one learning model 1720 or 1621 to be downloaded may have been retrained from the at least one learning model 1720 or 1621 trained by the electronic device 1001. For example, in order to retrain the at least one learning model 1720 or 1621 on which the training is completely performed, the electronic device 1001 may transmit the at least one learning model 1720 or 1621 to the server 1003 or the other electronic device 1002, and the server 1003 or the other electronic device 1002 may retrain the transmitted at least one learning model 1720 or 1621.

The model evaluation module 1734 may be executed by the first processor 1500 or by the second processor 1610 in response to a control signal of the first processor 1500, to evaluate accuracy or reliability of the at least one learning model 1720 or 1621. For example, the model evaluation module 1734 may evaluate the accuracy or reliability of the at least one learning model 1720 or 1621 by comparing the target data input to the at least one learning model 1720 or 1621 with output data output from the at least one learning model 1720 or 1621. For example, when it is determined that the difference between the target data and the output data is less than a preset level, the model evaluation module 1734 may evaluate the at least one learning model 1720 or 1621 as being reliable. As another example, when it is determined that the difference between the target data and the output data is greater than or equal to the preset level, the model evaluation module 1734 may evaluate the at least one learning model 1720 or 1621 as being unreliable. In various embodiments of the disclosure, the at least one learning model 1720 or 1621 evaluated as being reliable may be set to be completely trained, while the at least one learning model 1720 or 1621 evaluated as being unreliable may continue to be trained.

FIG. 2 is a diagram illustrating a method, performed by an electronic device, of performing image processing for obtaining noise-reduced image data 240 by using a learning model 220, according to an embodiment of the disclosure. Referring to FIG. 2, the electronic device (e.g., the electronic device 1001 of FIG. 1B) may perform image processing for obtaining the noise-reduced image data 240 by using at least one learning model 220 (e.g., the at least one learning model 1621 of FIG. 1B). According to an embodiment of the disclosure, raw image data 210 may be input to the at least one learning model 220. According to an embodiment of the disclosure, the raw image data 210 may be obtained from light reflected from at least one object, and may be configured to have a specified color array consisting of a plurality of colors with respect to a plurality of pixels. In various embodiments of the disclosure, the specified color array may not be limited to that illustrated in FIG. 2. For example, although the raw image data 210 illustrated in FIG. 2 has a color array based on a Bayer pattern, the raw image data 210 may have a color array based on any one of an RGBE pattern, an RYYB pattern, a CYYM pattern, a CYGM pattern, an RGBW Bayer pattern, and an X-Trans pattern.

According to an embodiment of the disclosure, as will be described below with reference to FIG. 3, the at least one learning model 220 may be understood as a learning model that is trained based on a plurality of sample images and that is based on at least one neural network. In various embodiments of the disclosure, the at least one neural network may include, but is not limited to, a deep neural network (DNN), an artificial neural network (ANN), a convolutional neural network (CNN), a recurrent neural network (RNN), etc.

According to an embodiment of the disclosure, the at least one learning model 220 may enable a noise reduction effect. For example, the at least one learning model 220 may be trained to output noise-reduced target data from input data to which random noise is applied, and accordingly, at least part of noise that may be included in the raw image data 210 input to the at least one learning model 220 may be removed from data obtained from the at least one learning model 220, for example, a color data set 230. The noise reduction will be described in more detail with reference to FIG. 3.

According to an embodiment of the disclosure, by inputting the raw image data 210 to the at least one learning model 220, the color data set 230 with respect to the plurality of pixels may be obtained. In an embodiment of the disclosure, the color data set 230 may include a plurality of pieces of color data classified into a plurality of colors. According to various embodiments of the disclosure, the types and number of the plurality of pieces of color data included in the color data set 230 may be determined based on the specified color array of the raw image data 210. For example, in the case where the raw image data 210 has a color array with a Bayer pattern, the color data set 230 may include a first piece of color data 231 representing intensities with respect to red light at the plurality of pixels, respectively, a second piece of color data 232 representing intensities with respect to green light at the plurality of pixels, respectively, and a third piece of color data 233 representing intensities with respect to blue light at the plurality of pixels, respectively. As another example, in the case where the raw image data 210 has a color array with an RGBW Bayer pattern, the color data set 230 may include the first piece of color data 231 representing intensities with respect to red light at the plurality of pixels, respectively, the second piece of color data 232 representing intensities with respect to green light at the plurality of pixels, respectively, the third piece of color data 233 representing intensities with respect to blue light at the plurality of pixels, respectively, and a fourth piece of color data representing intensities with respect to white light at the plurality of pixels, respectively.

According to an embodiment of the disclosure, after the color data set 230 is obtained, a pixel value with respect to each of the plurality of pixels of the image data 240 may be obtained. The pixel value is preferably obtained based on each piece of color data of the generated color data set. For example, a pixel value of a pixel (1, 1) of the image data 240 may be obtained based on a pixel value of a pixel (1, 1) of the first piece of color data 231, a pixel value of a pixel (1, 1) of the second piece of color data 232, and a pixel value of a pixel (1, 1) of the third piece of color data 233. For example, in the case where, for each pixel (1, 1), the pixel value of the first color data 231 is (R11), the pixel value of the second color data 232 is (G11), and the pixel value of the third color data 233 is (B11), the pixel value of the pixel (1, 1) of the image data 240 may be represented by '(R11, G11, B11)'. In various embodiments of the disclosure, the form of representing a pixel value may be determined based on the specified color array of the raw image data 210. For example, unlike as illustrated in FIG. 2, in the case where the raw image data 210 has a color array of an RGBW Bayer pattern, the pixel value of the pixel (1, 1) of the image data 240 may be represented by, for example, '(R11, G11, B11, W11)'.

According to an embodiment of the disclosure, when the pixel value with respect to each of the plurality of pixels of the image data 240 is obtained, the image data 240 of the object may be obtained. For example, each of the plurality of pixels may be represented by a color corresponding to the respective pixel value of the image data 240, and thus the image data 240 of the object may be obtained. According to an embodiment of the disclosure, because the at least one learning model 220 may have the noise reduction effect, the generated image data 240 may have been noise-reduced.

Figure 3:
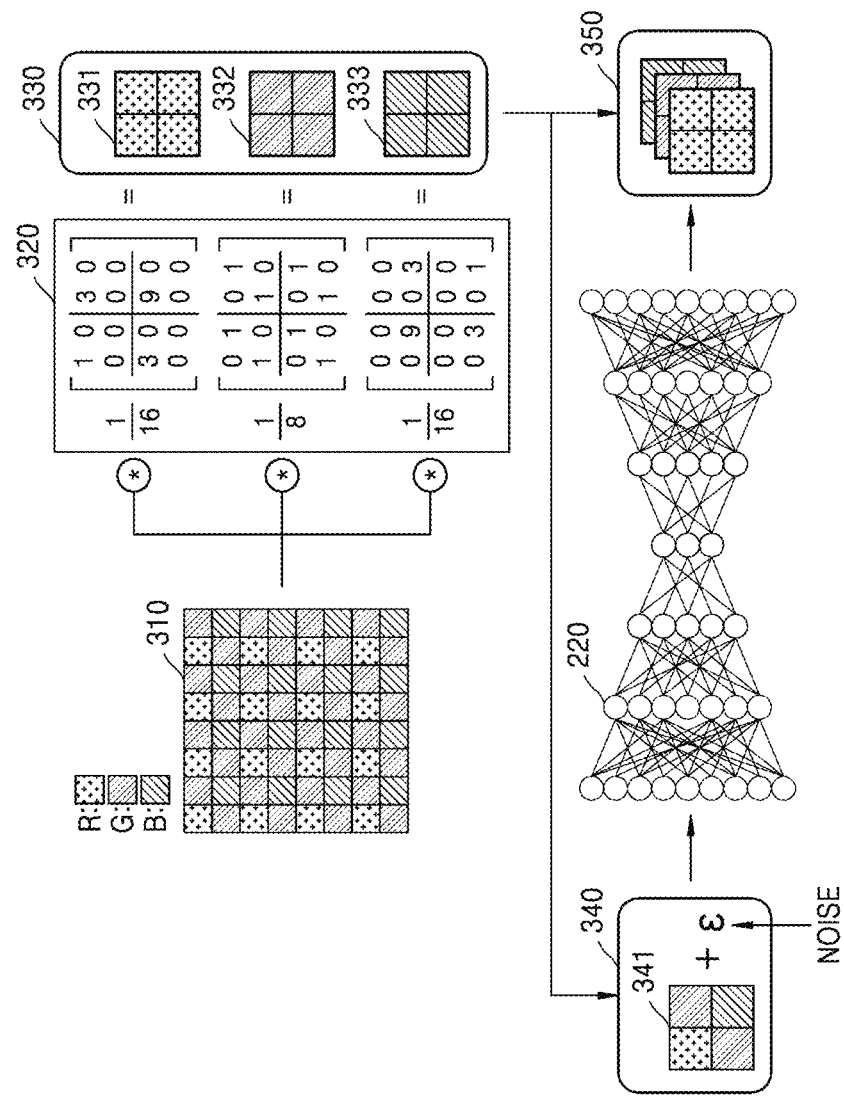
FIG. 3 is a diagram illustrating a method, performed by an electronic device, of training a learning model for image processing, according to an embodiment of the disclosure.

FIG. 3 is a diagram illustrating a method, performed by an electronic device, of training the at least one learning model 220 for image processing, according to an embodiment of the disclosure.

Referring to FIG. 3, the electronic device may train the at least one learning model 220 for image processing by using input data 340 (hereinafter, also referred to as the plurality of pieces of input data 340) and target data 350 (hereinafter, also referred to as the plurality of pieces of target data 350). According to an embodiment of the disclosure, the input data 340 and the target data 350 may be obtained based on a standard color data set 330, and the standard color data set 330 (hereinafter, also referred to as the plurality of standard color data sets 330 and the single standard color data set 330) may be obtained based on sample raw image data 310 (hereinafter, also referred to as the plurality of pieces of sample raw image data 310).

According to an embodiment of the disclosure, the sample raw image data 310 may be raw image data of a sample image for training the at least one learning model 220. In an embodiment of the disclosure, the sample raw image data 310 may be obtained from another electronic device or a server outside the electronic device. In another embodiment of the disclosure, the sample raw image data 310 may be obtained by the user capturing a sample image by using the electronic device. In another embodiment of the disclosure, the sample raw image data 310 may be obtained by the user selecting at least one sample image that matches the subjective preference of the user among a plurality of sample images. The subjective preference will then be reflected by the trained at least one learning model 220.

According to an embodiment of the disclosure, the electronic device may apply a down-sampling filter 320 to the sample raw image data 310. In an embodiment of the disclosure, the applying of the down-sampling filter 320 to the sample raw image data 310 may be understood as performing a convolution operation of the sample raw image data 310 and the down-sampling filter 320. In an embodiment of the disclosure, the down-sampling filter 320 may be a filter having a fixed pattern, such as an average filter or a sampling filter. In an embodiment of the disclosure, by applying the down-sampling filter 320 to the sample raw image data 310, the electronic device may obtain the standard color data set 330 including a plurality of pieces of standard color data. In various embodiments of the disclosure, the types and number of the plurality of pieces of standard color data may be based on a color array pattern of the sample raw image data 310.

According to an embodiment of the disclosure, the down-sampling filter 320 may lower or at least maintain the resolution of the sample raw image data 310. For example, as illustrated in FIG. 3, the down-sampling filter 320 may be represented by matrices each consisting of four rows and four columns. The resolution of the standard color data set 330 obtained by performing the convolution operation of the sample raw image data 310 and the down-sampling filter 320 may be ¼ of the resolution of the sample raw image data 310. For example, as illustrated in FIG. 3, in the case where the sample raw image data 310 has an 8×8 configuration, the standard color data set 330 may have a 2×2 configuration. The obtained ratio of the resolution of the standard color data set 330 and the sample raw image data 310 may further depend on a stride of the down-sampling filter 320 and padding eventually performed for the sample raw image data 310.

According to an embodiment of the disclosure, when the down-sampling filter 320 that lowers the resolution is applied, an average value of values obtained by applying certain weight values to pixel values of pixels with a certain color, among pixels included in a region of a preset size in the sample raw image data 310, may be calculated. For example, when the down-sampling filter 320 represented by the matrices each consisting of four rows and four columns is applied, an average value of values obtained by applying the certain weight values for each color to pixel values with respect to a region of a size of 4×4 of the sample raw image data 310, may be calculated. According to various embodiments of the disclosure, the certain weight values may be set to vary depending on the type of the down-sampling filter 320. In an embodiment of the disclosure, as illustrated in FIG. 3, a pixel value of a pixel (1, 1) of a first piece of standard color data 331 may be represented by '(R11+3×R13+3×R31+9×R33)/16' by using pixel values of the sample raw image data 310. In another embodiment of the disclosure, as illustrated in FIG. 3, a pixel value of a pixel (1, 1) of a second piece of standard color data 332 may be represented by '(G12+G14+G21+G23+G32+G34+G41+G43)/8' by using pixel values of the sample raw image data 310. In another embodiment of the disclosure, as illustrated in FIG. 3, a pixel value of a pixel (1, 1) of a third piece of standard color data 333 may be represented by '(9×B22+3×B24+3×B42+B44)/16' by using pixel values of the sample raw image data 310. In an embodiment of the disclosure, because each piece of standard color data includes the average values of the values obtained by applying the certain weight values to the corresponding pixel values with respect to the respective colors of the sample raw image data 310, the pieces of standard color data may be understood as noise-reduced average data.

According to an embodiment of the disclosure, the input data 340 to be input to the at least one learning model 220 and the target data 350 may be obtained based on the standard color data set 330. In an embodiment of the disclosure, the input data 340 may be obtained based on training raw image data 341 (hereinafter, also referred to as the single piece of training raw image data 341) obtained based on the standard color data set 330, and random noise generated by a noise generator. In an embodiment of the disclosure, because the standard color data set 330 may be understood as noise-reduced average data, the standard color data set 330 may be used as the target data 350. According to various embodiments of the disclosure, various pieces of data based on the standard color data set 330 may be used as the input data 340 and the target data 350, which will be described in detail with reference to FIGS. 6A to 6C and FIGS. 7A to 7C.

According to an embodiment of the disclosure, the training raw image data 341 may be raw image data that is re-mosaiced (i.e., mosaiced again) by using the standard color data set 330. According to an embodiment, the training raw image data 341 is generated by a process of reversely performing the de-mosaicing for generating the standard color data set 330. The resolution of the training raw image data 341 may be less than the resolution of the sample raw image data 310. For example, as illustrated in FIG. 3, in the case where all of the elements of the standard color data set 330 have a 2×2 configuration, the training raw image data 341 may be obtained by using a pixel value of a pixel (1, 1) of a first piece of color data, a pixel value of a pixel (1, 2) of a second piece of color data, a pixel value of a pixel (2, 1) of the second piece of color data, and a value of a pixel (2, 2) of a third piece of color data. Thus, elements of pieces of color data 331, 332, 333 of the standard color data set 330 may be combined for the training raw image data 341 considering a heuristic of the colors in the color array pattern of the raw image data 310.

The resolution of the training raw image data may also be equal to the resolution of the sample raw image data 310 and then the mosaicing may comprise up-sampling the standard color data sets 330. The up-sampling may be performed by one or more of transposed convolution, deconvolution, and fractionally-strided convolution or may comprise resizing the standard color data sets and convolution (resize-convolution).

According to an embodiment of the disclosure, the noise may be noise having an arbitrary value generated by the noise generator. In an embodiment of the disclosure, the noise may be generated considering shot noise related to nonuniformity of the amount of incident photons, or readout noise that may occur when the image sensor obtains the amount of received light.

According to an embodiment of the disclosure, the at least one learning model 220 may include at least one layer, and each layer may include at least one weight value. In an embodiment of the disclosure, the weight value may be set to a preset initial value. According to various embodiments of the disclosure, the electronic device may train the at least one learning model 220 by changing the weight value by using the input data 340 and the target data 350. For example, the electronic device may change the at least one weight value included in the at least one layer such that output data obtained as a result of inputting the input data 340 to the at least one learning model 220 becomes similar to the target data 350. For example, the electronic device may calculate a difference between the output data and the target data 350, and may train the at least one learning model 220 by changing the at least one weight value such that the difference is reduced.

According to an embodiment of the disclosure, the at least one learning model 220 may be trained by using the input data 340 and the target data 350 obtained based on each of the plurality of standard color data sets 330 that are different from each other. For example, the plurality of standard color data sets 330 that are different from each other may be obtained from the plurality of pieces of sample raw image data 310 that are different from each other, and the plurality of pieces of input data 340 that are different from each other and the plurality of pieces of target data 350 that are different from each other may be obtained from the plurality of standard color data sets 330 that are different from each other. The at least one learning model 220 may be trained by using the plurality of pieces of input data 340 that are different from each other and the plurality of pieces of target data 350 that are different from each other. According to another embodiment of the disclosure, the at least one learning model 220 may be trained by using the plurality of pieces of input data 340 and the plurality of pieces of target data 350 obtained based on a single standard color data set 330. For example, the single piece of training raw image data 341 obtained from the single standard color data set 330 may be combined with random noises different from each other, and the plurality of pieces of input data 340 that vary according to the random noises may be obtained. The at least one learning model 220 may be trained by using the plurality of pieces of input data 340 obtained by combining various random noises with the single piece of training raw image data 341.

According to an embodiment of the disclosure, when the accuracy of the at least one learning model 220 is improved by training the at least one learning model 220, the at least one learning model 220 may calculate, from the input data 340, output data that is the same as or similar to the target data 350, with high accuracy. In other words, in the case where the accuracy of the at least one learning model 220 is improved, the electronic device may obtain a noise-reduced color data set, from raw image data to which random noise is applied, by using the at least one learning model 220.

Figure 4:
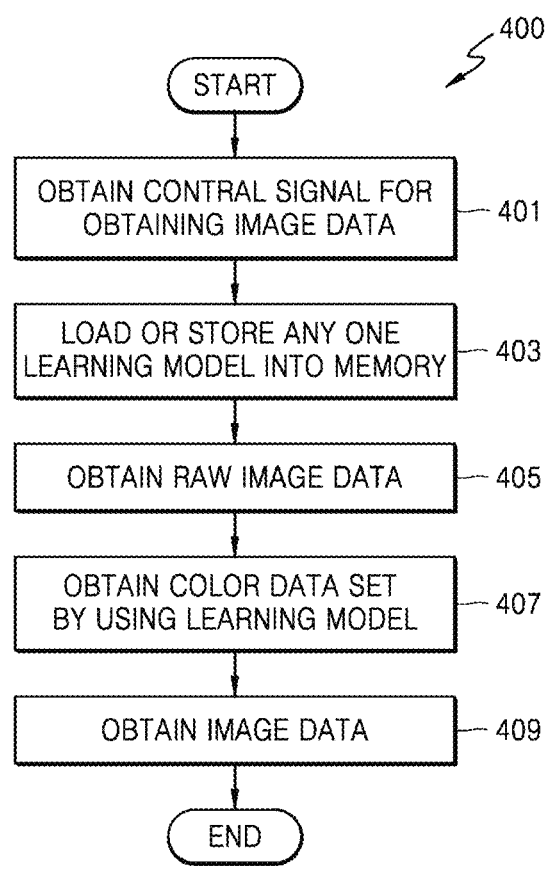
FIG. 4 is a flowchart of a method, performed by an electronic device, of performing image processing for generating noise-reduced image data by using a learning model, according to an embodiment of the disclosure.

FIG. 4 is a flowchart of a method 400, performed by an electronic device, of performing image processing for generating noise-reduced image data by using a learning model, according to an embodiment of the disclosure.

Referring to FIG. 4, the method 400, performed by the electronic device (e.g., the electronic device 1001 of FIG. 1B), of performing image processing for generating noise-reduced image data by using at least one learning model may include operations 401 to 409. According to various embodiments of the disclosure, operations 401 to 409 may be performed by the electronic device 1001 or the second processor 1610 illustrated in FIG. 1B. In various embodiments of the disclosure, the method 400, performed by the electronic device, of performing image processing is not limited to that illustrated in FIG. 4, and may omit any one of the operations illustrated in FIG. 4 or may further include an operation that is not illustrated in FIG. 4.

In operation 401, the electronic device obtain a control signal for obtaining image data. For example, the control signal may be transmitted from a first processor (e.g., the first processor 1500 of FIG. 1B) to a second processor based on a user input, for example, a user input corresponding to image capture. The second processor may obtain the control signal from the first processor.

In operation 403, the electronic device load or store any one learning model (e.g., the learning model 1621 of FIG. 1B) from among the at least one learning model (e.g., the at least one learning model 1720 of FIG. 1B) into a memory (e.g., the second memory 1620 of FIG. 1B). According to an embodiment of the disclosure, the at least one learning model may be stored in a first memory (e.g., the first memory 1700 of FIG. 1B), and when any one learning model is selected from the at least one learning model stored in the first memory, the selected learning model may be loaded or stored into a second memory.

According to an embodiment of the disclosure, the any one learning model may be selected from the at least one learning model. For example, the any one learning model may be selected by a user input, e.g., manually selected by the user. Further, the any one learning model may be automatically selected based on the preference of the user, or may be selected based on an image capture environment of the user. For example, the at least one learning model may be classified based on various attributes, and a learning model determined to be the most appropriate may be selected from the classified at least one learning model.

In operation 405, the electronic device obtain raw image data. For example, the electronic device may perform image capture on an object by using a camera module, and may obtain the raw image data by converting light reflected from the object into an electrical image signal by using an image sensor included in the camera module.

In operation 407, the electronic device obtain a color data set by using the any one learning model loaded or stored into the memory in operation 403. In an embodiment of the disclosure, the color data set may include a first piece of color data, a second piece of color data, and a third piece of color data. In various embodiments of the disclosure, the types and number of pieces of color data included in the color data set may be based on the color array pattern of the raw image data.

In an embodiment of the disclosure, the any one learning model may be, for example, any one learning model of the at least one learning model 220 illustrated in FIG. 3, may be trained by using a plurality of sample images, and may have a noise reduction effect. The electronic device may obtain the color data set by inputting, to the any one learning model, the raw image data obtained in operation 405. In an embodiment of the disclosure, the color data set may be data to which the noise reduction effect is applied.

In operation 409, the electronic device may obtain image data based on the color data set obtained in operation 407. According to an embodiment of the disclosure, the electronic device may obtain a pixel value with respect to each of a plurality of pixels of the image data based on the color data set. For example, a pixel value with respect to an arbitrary first pixel of the image data may be obtained by combining a pixel value with respect to the first pixel of the first piece of color data, a pixel value with respect to the first pixel of the second piece of color data, and a pixel value with respect to the first pixel of the third piece of color data. The electronic device may obtain the image data by using the obtained pixel values of the image data. The electronic device may display, on a display, an image of the object based on the obtained image data.

Figure 5:
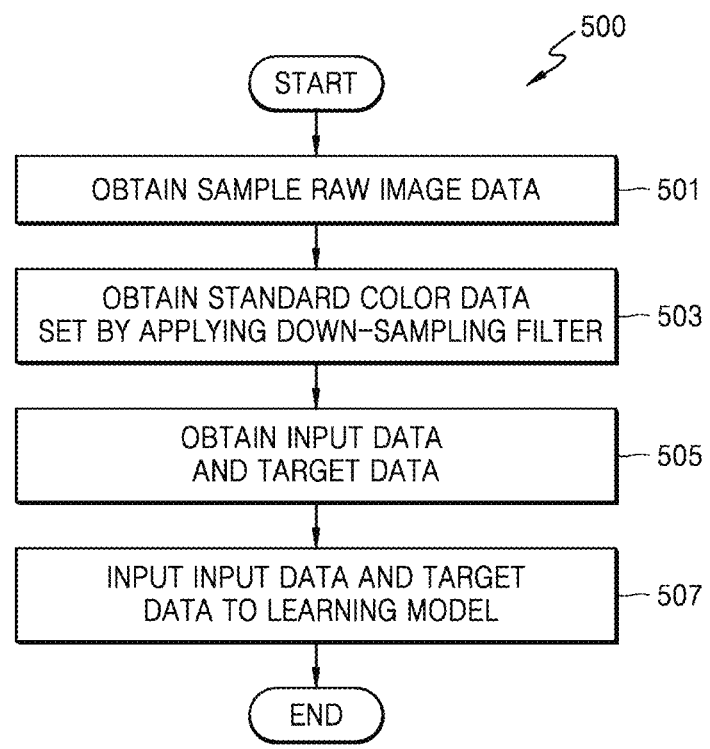
FIG. 5 is a flowchart of a method, performed by an electronic device, of training a learning model for image processing, according to an embodiment.

FIG. 5 is a flowchart of a method 500, performed by an electronic device, of training a learning model for image processing, according to an embodiment of the disclosure.

Referring to FIG. 5, the method 500, performed by the electronic device (e.g., the electronic device 1001 of FIG. 1B), of training at least one learning model (e.g., the learning models 1720 and 1621 of FIG. 1B or the at least one learning model 220 of FIG. 2) for image processing may include operations 501 to 507. According to various embodiments of the disclosure, operations 501 to 507 may be performed by the first processor 1500 or the second processor 1610 of the electronic device 1001 illustrated in FIG. 1B. In various embodiments of the disclosure, the method 500, performed by the electronic device, of training the at least one learning model is not limited to that illustrated in FIG. 5, and may omit any one of the operations illustrated in FIG. 5 or may further include an operation that is not illustrated in FIG. 5.

In operation 501, the electronic device may obtain sample raw image data. In various embodiments of the disclosure, the sample raw image data may be obtained from another electronic device or a server outside the electronic device, may be directly obtained by using a camera module included in the electronic device, or may be obtained based on a user input.

In operation 503, the electronic device may obtain a standard color data set by applying a down-sampling filter to the sample raw image data. In an embodiment of the disclosure, the standard color data set may include a plurality of pieces of standard color data. In an embodiment of the disclosure, the resolution of each piece of standard color data may be less than or equal to the resolution of the sample raw image data. In an embodiment of the disclosure, pixel values of each piece of standard color data may have average values of values obtained by applying weight values to pixel values with respect to pixels corresponding to a respective color within a certain region range of the sample raw image data. The standard color data set may be understood as data obtained by performing noise reduction processing on the sample raw image data.

In operation 505, the electronic device may obtain input data and target data for the at least one learning model, for example, the input data 340 and the target data 350 illustrated in FIG. 3. In various embodiments of the disclosure, the input data and the target data may be obtained based on the standard color data set obtained in operation 503.

In operation 507, the electronic device may input the input data and the target data to the at least one learning model.

For example, the electronic device may train the at least one learning model by comparing output data output by inputting the input data to the at least one learning model, with the target data. According to various embodiments of the disclosure, the electronic device may train the at least one learning model by changing weight values of a layer included in the at least one learning model such that a difference between the output data and the target data becomes lower than a preset level.

Figure 6A:
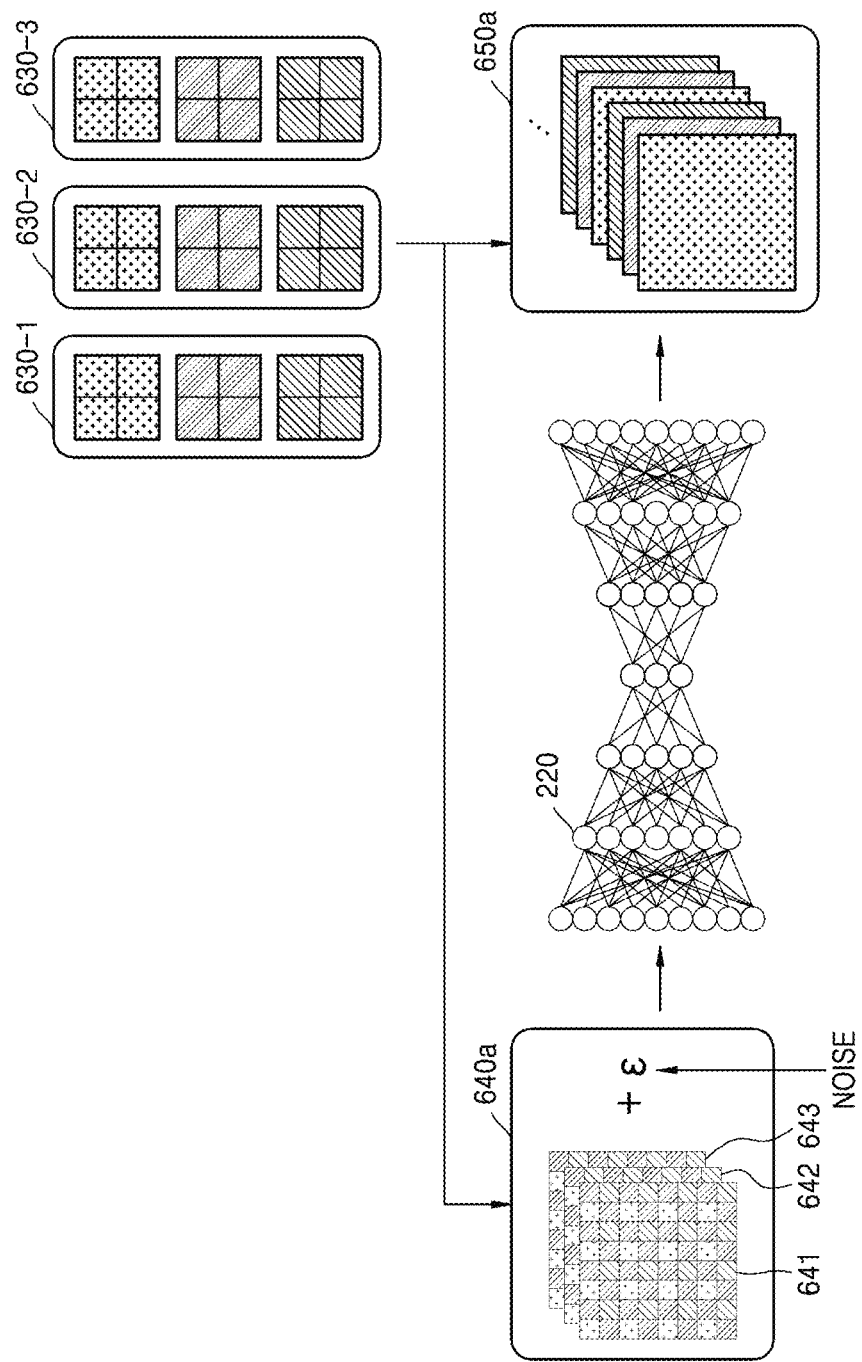
FIG. 6A is a diagram illustrating input data to be input to a learning model for image processing, and target data, according to an embodiment of the disclosure.
Figure 6B:
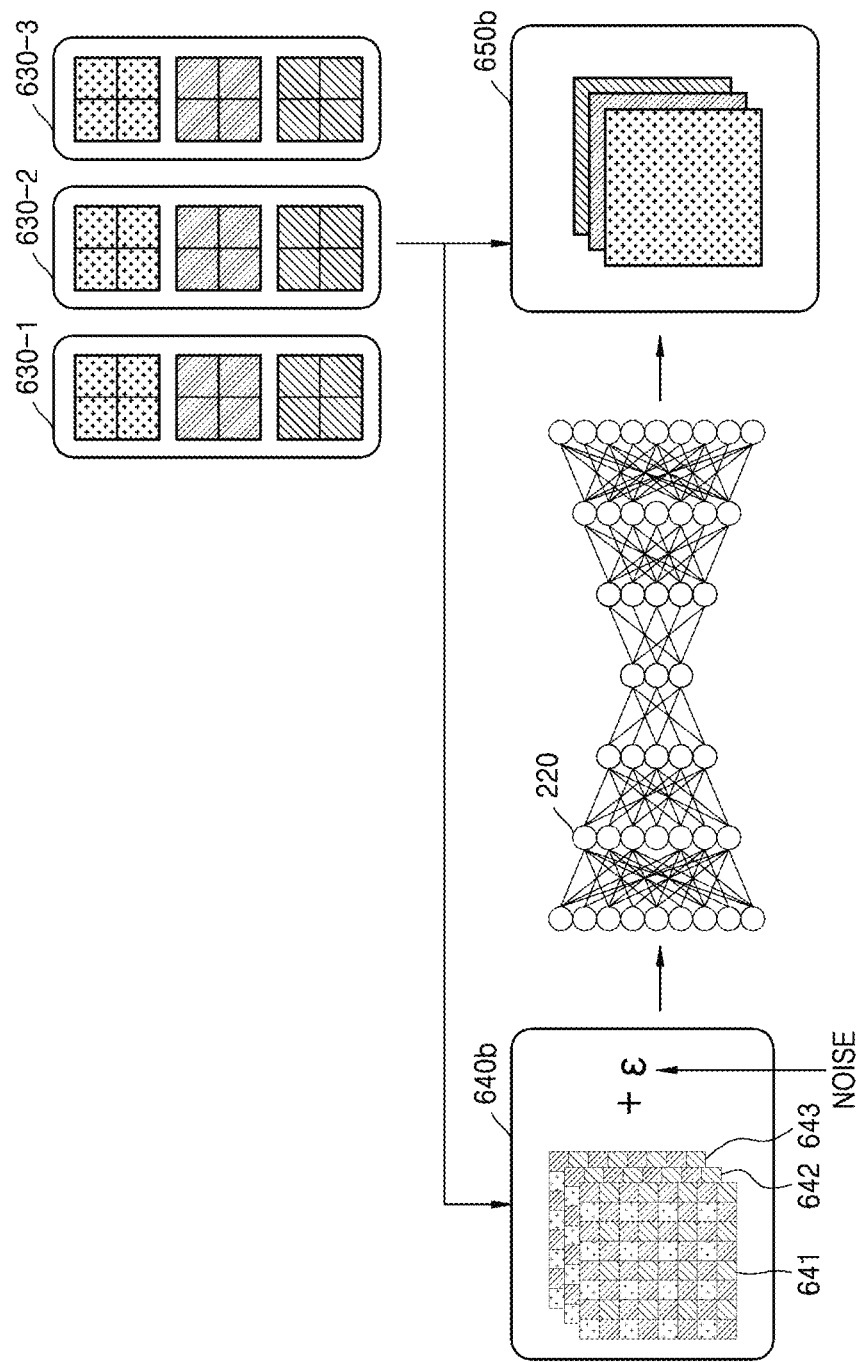
FIG. 6B is a diagram illustrating input data to be input to a learning model for image processing, and target data, according to another embodiment of the disclosure.

FIG. 6A is a diagram illustrating input data 640a to be input to the learning model 220 for image processing, and target data 650a, according to an embodiment of the disclosure. FIG. 6B is a diagram illustrating input data 640b to be input to the learning model 220 for image processing, and target data 650b, according to another embodiment of the disclosure. FIG. 6C is a diagram illustrating input data 640c to be input to the learning model 220 for image processing, and target data 650c, according to another embodiment of the disclosure.

Referring to FIG. 6A, the input data 640a and the target data 650a may be obtained based on a plurality of standard color data sets 630-1, 630-2, and 630-3 (hereinafter, also referred to as the first standard color data set 630-1, the second standard color data set 630-2, and the third standard color data set 630-3). According to an embodiment of the disclosure, the plurality of standard color data sets 630-1, 630-2, and 630-3 may be obtained by applying a downsampling filter to a plurality of pieces of sample raw image data, respectively.

According to an embodiment of the disclosure, the plurality of pieces of sample raw image data may be obtained by performing continuous image capture, i.e., capture multiple images in sequence. For example, the plurality of pieces of sample raw image data may be obtained by capturing images in sequence of one object at preset time intervals. In various embodiments of the disclosure, because the capturing of the images when obtaining the plurality of pieces of sample raw image data may be performed during a short time interval on one object, the similarity between the plurality of pieces of sample raw image data may be significantly high, and accordingly, the similarity between the plurality of standard color data sets 630-1, 630-2, and 630-3 obtained from the plurality of pieces of sample raw image data may be also significantly high.

According to an embodiment of the disclosure, the input data 640a may be obtained based on a plurality of pieces of training raw image data 641, 642, and 643 (hereinafter, also referred to as the first piece of training raw image data 641, the second piece of training raw image data 642, and the third piece of training raw image data 643) having high similarity therebetween, which are obtained from each of the plurality of standard color data sets 630-1, 630-2, and 630-3. For example, the input data 640a may include data obtained by combining the first piece of training raw image data 641 obtained from the first standard color data set 630-1, with random noise, data obtained by combining the second piece of training raw image data 642 obtained from the second standard color data set 630-2, with random noise, and data obtained by combining the third piece of training raw image data 643 obtained from the third standard color data set 630-3, with random noise. In various embodiments of the disclosure, the input data 640a may include a plurality of pieces of data having high similarity therebetween, and in this case, the accuracy of the at least one learning model 220 may be further improved. Also, the training of the at least one learning model 220 may be accelerated.

According to an embodiment of the disclosure, the target data 650a may correspond to the plurality of standard color data sets 630-1, 630-2, and 630-3. In various embodiments of the disclosure, the target data 650a may include a plurality of pieces of data having high similarity therebetween, and in this case, the accuracy of the at least one learning model 220 may be further improved. Also, the training of the at least one learning model 220 may be accelerated.

Referring to FIG. 6B, the input data 640b and the target data 650b may be obtained based on the plurality of standard color data sets 630-1, 630-2, and 630-3. According to an embodiment of the disclosure, the input data 640b may be obtained based on the plurality of pieces of training raw image data 641, 642, and 643 having high similarity therebetween, like the embodiment illustrated in FIG. 6A. According to an embodiment of the disclosure, the target data 650b may be obtained based on any one of the plurality of standard color data sets 630-1, 630-2, and 630-3, unlike as illustrated in FIG. 6A. For example, the target data 650b may correspond to the first standard color data set 630-1, the second standard color data set 630-2, or the third standard color data set 630-3.

Referring to FIG. 6C, the input data 640c and the target data 650c may be obtained based on a standard color data set 630c based on an RGBW Bayer pattern. For example, the standard color data set 630c may be obtained based on sample raw image data obtained based on the RGBW Bayer pattern. In this case, the input data 640c may correspond to data obtained by combining training raw image data 641c based on the RGBW Bayer pattern with random noise, and the target data 650c may correspond to the standard color data set 630c based on the RGBW Bayer pattern. According to various embodiments of the disclosure, unlike as illustrated in FIG. 6C, the input data 640c and the target data 650c may be obtained based on standard color data based on a pattern other than a Bayer pattern or the RGBW Bayer pattern, for example, any one of an RGBE pattern, an RYYB pattern, a CYYM pattern, a CYGM pattern, an X-Trans pattern, etc.

According to various embodiments of the disclosure, the input data 640a, 640b, and 640c and the target data 650a, 650b, and 650c described with reference to FIGS. 6A to 6C may be combined with each other, to be input to the at least one learning model 220. For example, the input data 640a described with reference to FIG. 6A may be combined with any one of target data that will be described with reference to FIGS. 7A to 7C, to be input to the at least one learning model.

Figure 7A:
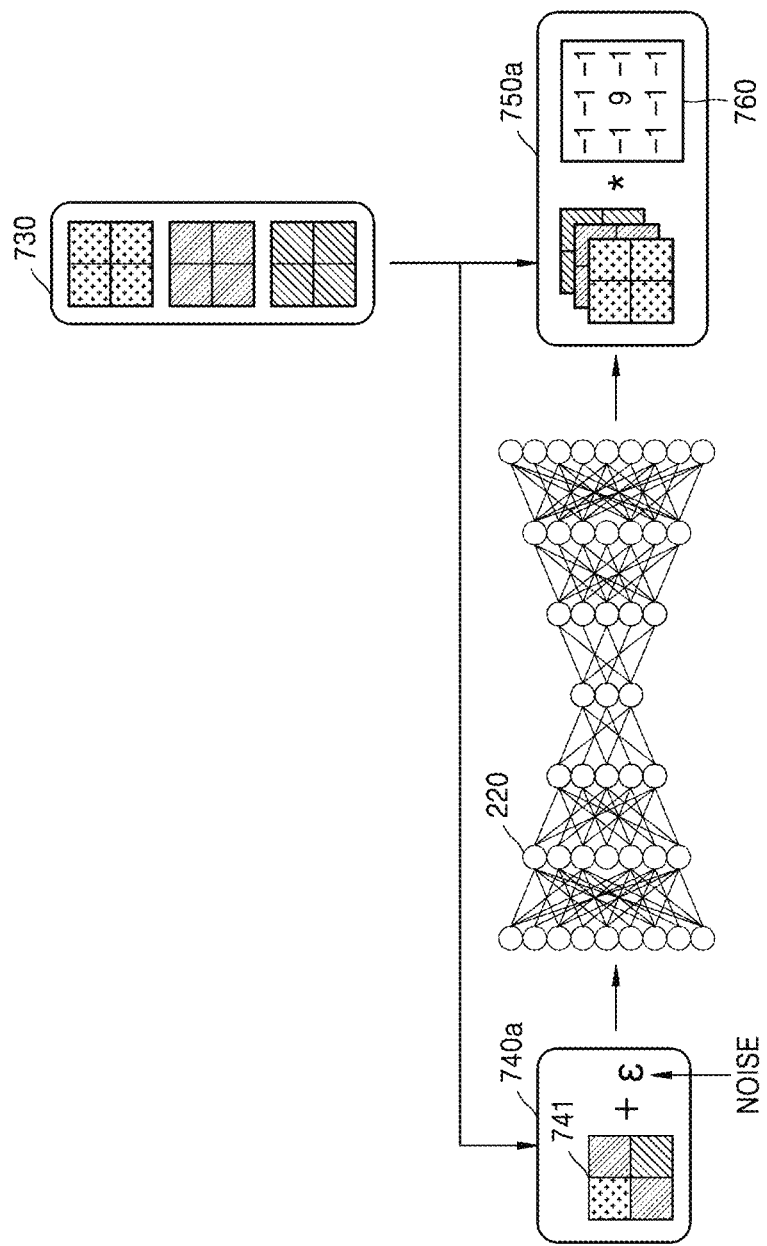
FIG. 7A is a diagram illustrating input data and target data for improving performance of a learning model for image processing, according to an embodiment of the disclosure.
Figure 7B:
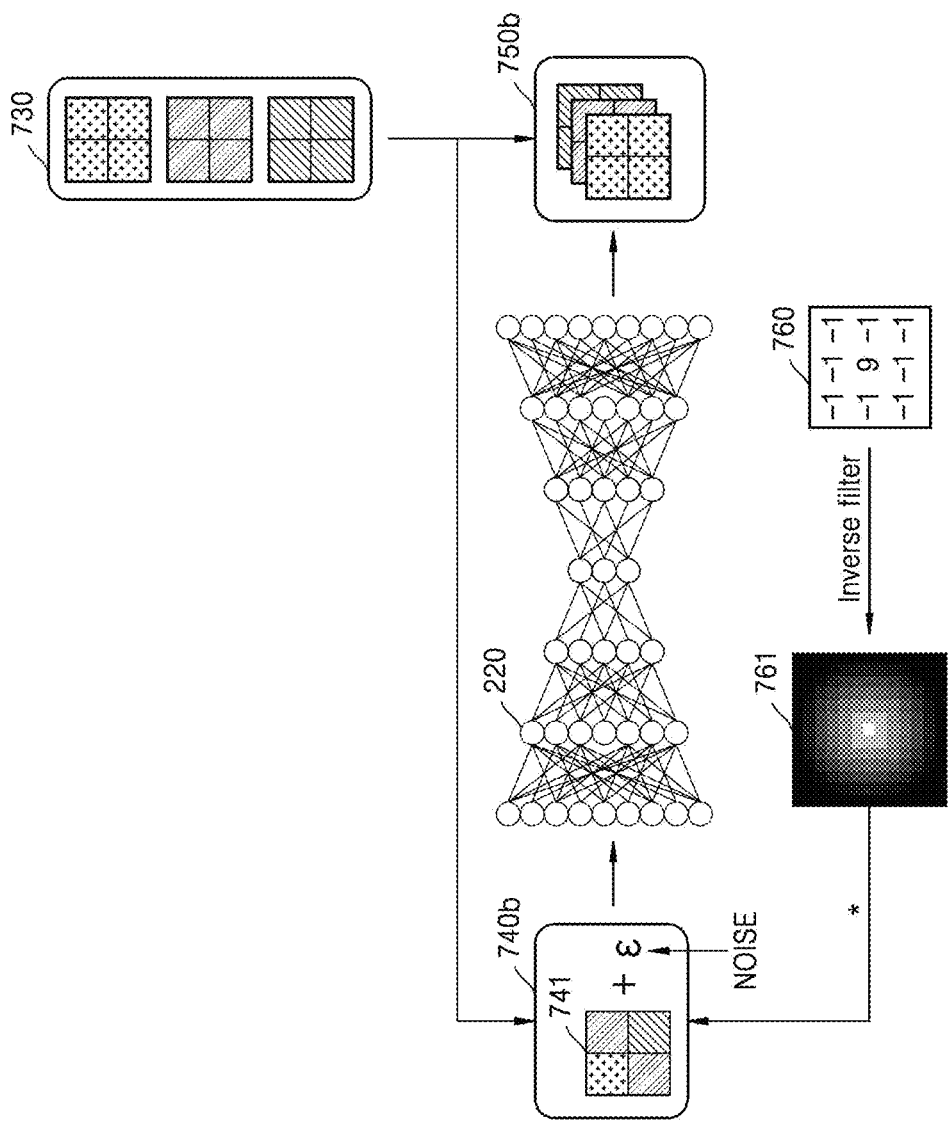
FIG. 7B is a diagram illustrating input data and target data for improving performance of a learning model for image processing, according to another embodiment of the disclosure.
Figure 7C:
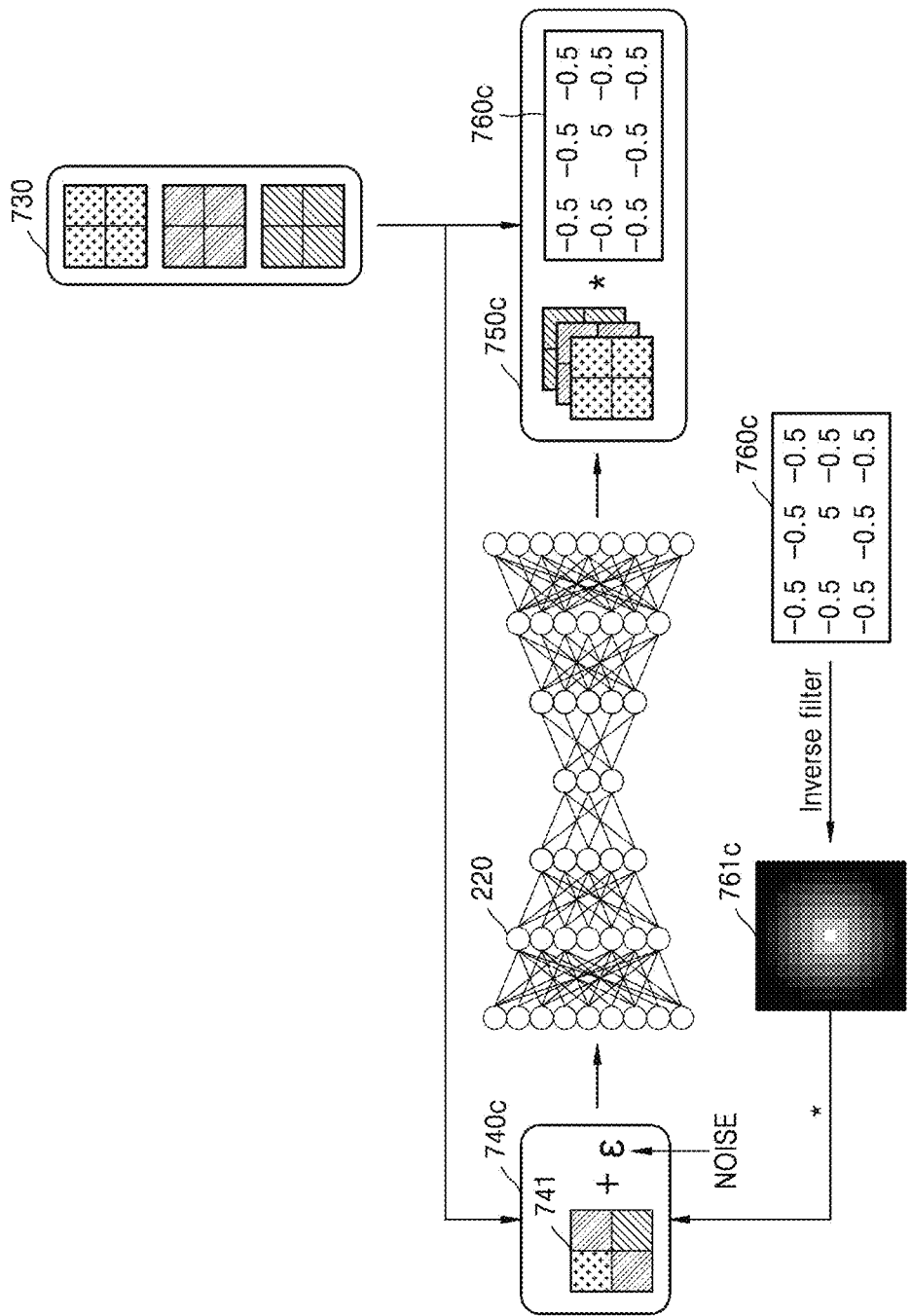
FIG. 7C is a diagram illustrating input data and target data for improving performance of a learning model for image processing, according to another embodiment of the disclosure.

FIG. 7A is a diagram illustrating input data 740a and target data 750a for improving performance of the learning model 220 for image processing, according to an embodiment of the disclosure. FIG. 7B is a diagram illustrating input data 740b and target data 750b for improving performance of the learning model 220 for image processing, according to another embodiment of the disclosure. FIG. 7C is a diagram illustrating input data 740c and target data 750c for improving performance of the learning model 220 for image processing, according to another embodiment of the disclosure.

Referring to FIG. 7A, the input data 740a and the target data 750a may be obtained based on a standard color data set 730. According to an embodiment of the disclosure, the input data 740a may correspond to data obtained by combining training raw image data 741 obtained based on the standard color data set 730, with random noise. According to an embodiment of the disclosure, the target data 750a may be obtained by applying at least one image filter 760 to the standard color data set 730. The applying of the at least one image filter 760 to the standard color data set 730 may be understood as performing a convolution operation of the standard color data set 730 and the at least one image filter 760. The at least one image filter 760 may include, for example, an unsharp mask filter or an edge enhancing filter, and may include various image filters capable of improving the quality of an image. According to various embodiments of the disclosure, the at least one image filter 760 may be a preset filter or a filter selected based on a user input.

According to an embodiment of the disclosure, in the case where the at least one image filter 760 is applied to the standard color data set 730 to generate the target data 750*a*, the at least one learning model 220 may be trained by using the target data 750*a* such that output data for the input data 740*a* further has the effect of the image filter 760. For example, it may be understood that, when the target data 750*a* to which the at least one image filter 760 is applied is used, the target data 750*a* that is a target that the output data, which is output from the at least one learning model 220, is to be, further has the effect of the image filter 760. The electronic device may output a color data set to which an image quality improvement effect of the image filter 760 is further applied, from arbitrary raw image data by using the at least one learning model 220 that is trained by using the target data 750*a* to which the image filter 760 is applied, and may generate image data to which the effect is further applied.

Referring to FIG. 7B, the input data 740*b* and the target data 750*b* may be obtained based on the standard color data set 730. According to an embodiment of the disclosure, the target data 750*b* may correspond to the standard color data set 730. According to an embodiment of the disclosure, the input data 740*b* may be obtained by applying an inverse filter 761 of the at least one image filter 760, to data obtained by combining the training raw image data 741 obtained based on the standard color data set 730, with random noise. In an embodiment of the disclosure, the inverse filter 761 of the at least one image filter 760 may be understood as a filter corresponding to an inverse matrix of the matrix representing the at least one image filter 760.

According to an embodiment of the disclosure, in the case where the inverse filter 761 of the at least one image filter 760 is applied to the data in which the training raw image data 741 is combined with the random noise to generate the input data 740*b*, and then the input data 740*b* is used, the same or similar effect as in using the target data 750*b* to which the at least one image filter 760 is applied may be obtained. For example, the electronic device may output a color data set to which the image quality improvement effect of the image filter 760 is further applied, from arbitrary raw image data by using the at least one learning model 220 that is trained by using the input data 740*b* to which the inverse filter 761 of the image filter 760 is applied, and may generate image data to which the effect is further applied.

Referring to FIG. 7C, the input data 740*c* and the target data 750*c* may be obtained based on the standard color data set 730. According to an embodiment of the disclosure, the target data 750*c* may be obtained by applying at least one image filter 760*c* to the standard color data set 730, and the input data 740*c* may be obtained by applying an inverse filter 761*c* of the at least one image filter 760*c* to data in which the training raw image data 741 obtained based on the standard color data set 730 is combined with random noise. For example, a coefficient of the at least one image filter 760*c* may be adjusted, the coefficient-adjusted image filter 760*c* may be applied to the standard color data set 730, and the inverse filter 761*c* of the coefficient-adjusted image filter 760*c* may be applied to the data in which the training raw image data 741 is combined with the random noise.

According to an embodiment of the disclosure, in the case where the coefficient-adjusted image filter 760*c* is applied to the at least one learning model 220, and the target data 750*c* and the input data 740*c* to which the inverse filter 761*c* of the coefficient-adjusted image filter 760*c* is applied are used, the same or similar effect as in using the target data 750*c* to which the at least one image filter 760*c* is applied may be obtained. For example, the electronic device may output a color data set to which the image quality improvement effect of the image filter 760*c* is further applied, from arbitrary raw image data by using the at least one learning model 220 that is trained by using the input data 740*c* and the target data 750*c*, and may generate image data to which the effect is further applied.

Figure 8:
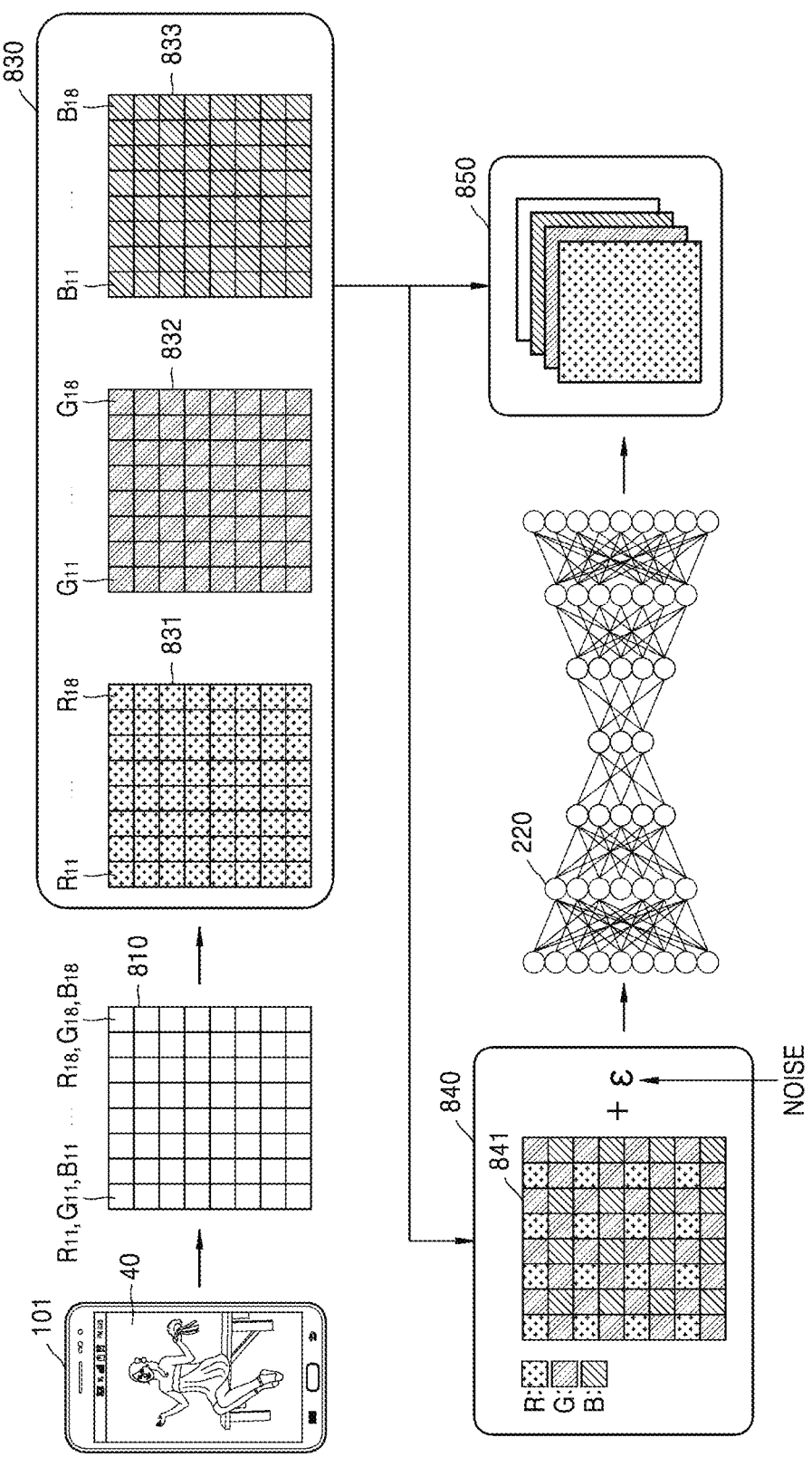
FIG. 8 is a diagram illustrating a method, performed by an electronic device, of retraining a learning model for image processing, according to an embodiment of the disclosure.

FIG. 8 is a diagram illustrating a method, performed by an electronic device 101, of retraining the learning model 220 for image processing, according to an embodiment of the disclosure.

Referring to FIG. 8, the electronic device 101 may retrain the learning model 220 for image processing by using at least one image. According to an embodiment of the disclosure, the electronic device 101 may retrain the at least one learning model 220 by using retraining input data 840 and retraining target data 850. According to an embodiment of the disclosure, the retraining input data 840 and the retraining target data 850 may be obtained based on a retraining standard color data set 830.

According to an embodiment of the disclosure, the retraining target data 850 may correspond to the retraining standard color data set 830. In another embodiment of the disclosure, the retraining target data 850 may correspond to a plurality of retraining standard color data sets, or may correspond to data obtained by applying at least one image filter to the retraining standard color data set 830. According to an embodiment of the disclosure, the retraining input data 840 may correspond to data in which retraining raw image data 841 obtained based on the retraining standard color data set 830 is combined with random noise. In another embodiment of the disclosure, the retraining input data 840 may correspond to data in which a plurality of pieces of retraining raw image data are combined with random noise, or may correspond to data by applying an inverse filter of the at least one image filter to the data in which the retraining raw image data 841 is combined with the random noise.

Although FIG. 8 illustrates that the retraining raw image data 841 is obtained based on the retraining standard color data set 830, in an embodiment of the disclosure, the retraining raw image data 841 may be raw image data corresponding to retraining sample image data 810 (hereinafter, also referred to as the one or more pieces of retraining sample image data 810) and may be obtained from a memory (e.g., the first memory 1700 illustrated in FIG. 1B) of the electronic device (e.g., the electronic device 1001 of FIG. 1B) or from outside of the electronic device (e.g., the server 1003 or the other electronic device 1002 illustrated in FIG. 1B). In this case, the retraining input data 840 may correspond to data in which the retraining raw image data 841 obtained from the memory of the electronic device or from outside of the electronic device is combined with random noise.

According to an embodiment of the disclosure, the retraining standard color data set 830 may include a plurality of pieces of retraining standard color data 831, 832, and 833 (hereinafter, also referred to as the first piece of retraining standard color data 831, the second piece of retraining standard color data 832, and the third piece of retraining standard color data 833). For example, the retraining standard color data set 830 may include, based on a Bayer pattern, the first piece of retraining standard color data 831 corresponding to a red color, the second piece of retraining standard color data 832 corresponding to a green color, and the third piece of retraining standard color data 833 corresponding to a blue color. According to an embodiment of the disclosure, the retraining standard color data set 830 may be obtained from the retraining sample image data 810. For example, in the case where a pixel value with respect to a pixel (n, m) of the retraining sample image data 810 is (Rnm, Gnm, Bnm), the electronic device 101 may generate the retraining standard color data set 830 by determining a pixel value with respect to a pixel (n, m) of the first piece of retraining standard color data 831 to be (Rnm), determining a pixel value with respect to a pixel (n, m) of the second piece of retraining standard color data 832 to be (Gnm), and determining a pixel value with respect to a pixel (n, m) of the third piece of retraining standard color data 833 to be (Bnm).

According to an embodiment of the disclosure, the resolution of the retraining standard color data set 830 obtained from the retraining sample image data 810 may be equal to the resolution of the retraining sample image data 810. According to another embodiment of the disclosure, the resolution of a retraining standard color data set obtained from the retraining sample image data 810 may be less than the resolution of the retraining sample image data 810 as a down-sampling filter is applied. According to an embodiment of the disclosure, because the retraining sample image data 810 may be image data on which noise reduction processing has already been performed or image data to which an effect corresponding to the preference of the user is applied, the retraining standard color data set 830 may be used as the target data 850 even when it has the same resolution as the resolution of the retraining sample image data 810.

According to an embodiment of the disclosure, as illustrated in FIG. 8, the retraining sample image data 810 may be obtained from an image 40 (hereinafter, also referred to as the one or more images 40) displayed on a display of the electronic device 101. For example, the user may select, through the display, for example, a touch display, the image 40 that matches the preference of the user, and the selected image 40 may be used as the retraining sample image data 810. According to various embodiments of the disclosure, the user may select the one or more images 40 via a user input. According to various embodiments of the disclosure, the user may apply, via a user input, a correction effect that matches the preference of the user, to the image 40 displayed on the display, and the image 40 to which the correction effect is applied may be used as the retraining sample image data 810.

According to various embodiments of the disclosure, the retraining sample image data 810 may be selected based on attributes preferred by the user, regardless of a user input. For example, the attributes preferred by the user may include at least one of an image filter that the user has used more frequently than a preset number of times, a lens that the user has used more frequently than a preset number of times, or image meta information (e.g., ISO information, a shutter speed value, a white balance value, etc.) that the user has used more frequently than a preset number of times. The preset number may be based on a particular value or may be based on the number of times other comparable options have been used. In another embodiment, the user preference may be determined by finding an option, e.g., a particular image filter, a particular lens, or a particular image meta information, that has been used the most. The electronic device may select an image that is determined to correspond to the attributes preferred by the user and use the selected image as the retraining sample image data 810.

According to various embodiments of the disclosure, the retraining sample image data 810 may be obtained from a service provider, e.g., online service provider or a service provider in the cloud, unlike as illustrated in FIG. 8. For example, in order to retrain the at least one learning model 220, the service provider may transmit the one or more pieces of retraining sample image data 810 to the electronic device 101 by using a network, and the electronic device 101 may retrain the at least one learning model 220 by using the transmitted retraining sample image data 810.

In the following, various embodiments of the method of the present disclosure are described, which may apply generally to a method of the present disclosure, independently of the description of one or more operation(s) as illustrated in and described with respect to the figures.

According to an embodiment of the disclosure, a method, performed by an electronic device including a camera module, of generating noise-reduced image data of an object may include obtaining, by a second processor of the electronic device, from a first processor of the electronic device, a control signal for obtaining image data, loading or storing any one learning model from among at least one learning model into a memory, obtaining, by using the camera module, raw image data of the object, from light reflected from the object, the raw image data being configured to have a specified color array consisting of a plurality of colors with respect to a plurality of pixels, obtaining, by using the loaded or stored any one learning model, a color data set with respect to the plurality of pixels from the obtained raw image data, the color data set including a plurality of pieces of color data classified according to the plurality of colors, and obtaining the noise-reduced image data of the object by using the obtained color data set. Advantageously, with the method of the disclosure, noise-reduced image data is generated (or obtained) from raw image data without the need for an image signal processor, ISP. Particularly, the functionality of such ISP is provided by at least one learning model as specified herein, wherein the at least one learning model is further capable of reducing random noise such as shot noise or readout noise from the raw image data. Also, the at least one learning model may comprise multiple learning models, individual learning models corresponding to different user preferences, different environments for obtaining the raw image data and/or different hardware configurations.

According to an embodiment of the disclosure, for the embodiments described in the paragraphs above, the at least one learning model may be trained by using input data and target data, the target data may be obtained based on a standard color data set including a plurality of pieces of standard color data classified according to the plurality of colors, the plurality of pieces of standard color data being obtained by applying a down-sampling filter to sample raw image data, and the input data may be obtained based on training raw image data obtained by performing mosaicing based on the standard color data set, and random noise generated by a noise generator. Advantageously such training allows for effectively resembling the functionality of the ISP by the at least one learning model and for additional noise reduction.

According to an embodiment of the disclosure, for the embodiments described in the paragraphs above, the target data may be obtained based on a plurality of standard color data sets obtained from a plurality of pieces of sample raw image data that are captured in sequence. In an embodiment of the disclosure, the input data may be obtained based on a plurality of pieces of training raw image data obtained by performing mosaicing based on each of the plurality of standard color data sets, and the random noise.

According to an embodiment of the disclosure, for the embodiments described in the paragraphs above, the target data may be obtained based on any one of a plurality of standard color data sets obtained from a plurality of pieces of sample raw image data that are captured in sequence, and the input data may be obtained based on a plurality of pieces of training raw image data obtained by performing mosaicing based on each of the plurality of standard color data sets, and the random noise. The plurality of pieces of training raw image data are preferably generated by performing mosaicing based on each of the plurality of standard color data sets. The training input data and/or the training target data may include a plurality of pieces of data having high similarity therebetween and thus the accuracy of the at least one learning model may advantageously be further improved.

According to an embodiment of the disclosure, for the embodiments described in the paragraphs above, the specified color array may be any one of a Bayer pattern, a red-green-blue-emerald (RGBE) pattern, a red-yellow-yellow-blue (RYYB) pattern, a cyan-yellow-yellow-magenta (CYYM) pattern, a cyan-yellow-green-magenta (CYGM) pattern, a red-green-blue-white (RGBW) Bayer pattern, and an X-Trans pattern. The method is thus usable for generating noise-reduced image data from raw image data provided by one of a plurality common image sensors. Common image sensors may include a color filter array that is co-located with the sensor pixels configured for converting incident photons into an electric signal for measuring an intensity of the incident light. Therein, the color filter array of the image sensor may correspond to the specified color array used in the method of an embodiment.

According to an embodiment of the disclosure, for the embodiments described in the paragraphs above, the target data may be obtained by applying at least one image filter to the standard color data set.

According to an embodiment of the disclosure, for the embodiments described in the paragraphs above, the input data may be obtained by applying an inverse filter of at least one image filter, to data in which the training raw image data is combined with the random noise. The training raw image data is preferably acquired by mosaicing standard color data sets that were generated by down-sampling sample raw image data. The resolution of the training raw image data is preferably less than or equal to the resolution of the sample raw image data. The at least one learning model can advantageously be trained such that output data for the input data further has the effect of the at least one image filter.

According to an embodiment of the disclosure, for the embodiments described in the paragraphs above, the at least one learning model may include at least one layer including at least one weight value, and the at least one learning model may be trained by changing the at least one weight value such that a difference between output data obtained by inputting the input data to the at least one learning model, and the target data is reduced. Preferably, the at least learning model is based on a neural network and comprises neural network layers. Further preferred, each of the plurality of neural network layers has a plurality of weight values, and performs a neural network operation through an operation between an operation result of a previous layer and the plurality of weight values. The plurality of weight values in each of the plurality of neural network layers may be optimized by a result of training the at least learning model. The at least one learning model of the disclosure is preferably characterized by a (neural network) layer structure and weight values, wherein the weight values are optimized by training. The at least one learning model may be applied to a device, e.g., to a device of the present disclosure, by storing the (neural network) layer structure and initial weight values. The at least one learning model may be updated on the device by storing updated weight values on the devices (e.g., acquired by retraining).

According to an embodiment of the disclosure, for the embodiments described in the paragraphs above, the at least one learning model may be retrained by using retraining input data and retraining target data, the retraining target data may be obtained based on a retraining standard color data set obtained from image data selected based on a user input, and the retraining input data may be obtained based on retraining raw image data obtained based on the retraining standard color data set, and the random noise. Preferably, retraining refers to repeated training of the at least one learning model on which the training is (has been) completely performed (previously).

According to an embodiment of the disclosure, for the embodiments described in the paragraphs above, the at least one learning model may be retrained by using retraining input data and retraining target data, the retraining target data may be obtained based on a retraining standard color data set obtained from image data selected based on a user input, and the retraining input data may be obtained based on raw image data corresponding to the selected image data. According to an embodiment of the disclosure, the at least one learning model comprises a plurality of learning models, wherein each of the plurality of learning models is classified according to at least one of various attributes related to an image, a user and/or a hardware configuration of the electronic device. The various attributes for classifying the at least one learning model preferably include a filter applied to an image, a camera (lens) used for image capture, a vendor (manufacturer) of the image sensor, a type (model) of the electronic device, an image capture environment, characteristics of a captured object, a user's configuration, a user's selection or a combination thereof. One of the plurality of learning models is preferably selected for processing a certain raw image data into noise-reduced image data in the method of the present disclosure based on the classification, particularly preferred based on at least one of the various attributes. The attribute for selecting the one learning model preferably corresponds to a property of an image (filter data, meta data), a property of a lens used for capturing the raw image data, a property of the image sensor or the electronic device, a detected environment for capturing the raw image data, characteristics of a captured object, a user's configuration, a user's selection or a combination thereof.

According to an embodiment of the disclosure, for the embodiments described in the paragraphs above, the camera module may include a first camera module and a second camera module, the at least one learning model may include a first learning model corresponding to the first camera module and a second learning model corresponding to the second camera module, first raw image data obtained by using the first camera module may be noise-reduced by using the first learning model, and second raw image data obtained by using the second camera module may be noise-reduced by using the second learning model. This embodiment advantageously allows for creating noise-reduced image data from raw image data provided by each of the first and second camera module. Each of the first learning model and the second learning model may be trained as described above, wherein a plurality of pieces of first standard color data may be obtained by applying a down-sampling filter to sample raw image data of the first camera module and wherein a plurality of pieces of second standard color data may be obtained by applying a down-sampling filter to sample raw image data of the second camera module.

In the following, various embodiments of the electronic device of the present disclosure are described, which may apply generally to an electronic device of the present disclosure, independently of the description of one or more component(s) as illustrated in and described with respect to the figures.

According to an embodiment of the disclosure, an electronic device for generating noise-reduced image data of an object may include a camera module, a first memory storing at least one learning model, a first processor electrically connected to the camera module and the first memory, and an artificial intelligence processing unit electrically connected to the camera module and the first processor, and including a second processor and a second memory, wherein the first processor is configured to transmit, to the second processor, a control signal for obtaining the image data, and the second processor is configured to, in response to obtaining the control signal, load or store any one learning model from among the at least one learning model into the second memory, obtain, by using the camera module, raw image data of the object from light reflected from the object, the raw image data being configured to have a specified color array consisting of a plurality of colors with respect to a plurality of pixels, generate, by using the any one learning model loaded or stored into the second memory, a color data set with respect to the plurality of pixels from the obtained raw image data, the color data set comprising a plurality of pieces of color data classified according to the plurality of colors, and generate the noise-reduced image data of the object by using the obtained color data set. Advantageously, with the electronic device of the disclosure, noise-reduced image data is generated from raw image data without the need for an image signal processor, ISP. Particularly, the functionality of such ISP is provided by at least one learning model as specified herein, wherein the at least one learning model is further capable of reducing random noise such as shot noise or readout noise from the raw image data. Also, the at least one learning model may comprise multiple learning models, individual learning models corresponding to different user preferences, different environments for obtaining the raw image data and/or different hardware configurations.

According to an embodiment of the disclosure, for the embodiments described in the paragraphs above, the at least one learning model may be trained by using input data and target data, the target data may be obtained based on a standard color data set comprising a plurality of pieces of standard color data classified according to the plurality of colors, the plurality of pieces of standard color data being obtained by applying a down-sampling filter to sample raw image data, and the input data may be obtained based on training raw image data obtained by performing mosaicing based on the standard color data set, and random noise generated by a noise generator. Advantageously such training allows for effectively resembling the functionality of the ISP by the at least one learning model and for the additional noise reduction.

According to an embodiment of the disclosure, for the embodiments described in the paragraphs above, the target data may be obtained based on a plurality of standard color data sets obtained from a plurality of pieces of sample raw image data that are captured in sequence. In an embodiment of the disclosure, the input data may be obtained based on a plurality of pieces of training raw image data obtained by performing mosaicing based on each of the plurality of standard color data sets, and the random noise.

According to an embodiment of the disclosure, for the embodiments described in the paragraphs above, the target data may be obtained based on any one of a plurality of standard color data sets obtained from a plurality of pieces of sample raw image data that are captured in sequence, and the input data may be obtained based on a plurality of pieces of training raw image data obtained by performing mosaicing based on each of the plurality of standard color data sets, and the random noise. The training input data and/or the training target data may include a plurality of pieces of data having high similarity therebetween and thus the accuracy of the at least one learning model may advantageously be further improved.

According to an embodiment of the disclosure, for the embodiments described in the paragraphs above, the specified color array may be any one of a Bayer pattern, a red-green-blue-emerald (RGBE) pattern, a red-yellow-yellow-blue (RYYB) pattern, a cyan-yellow-yellow-magenta (CYYM) pattern, a cyan-yellow-green-magenta (CYGM) pattern, a red-green-blue-white (RGBW) Bayer pattern, and an X-Trans pattern. The camera module of the electronic device may thus comprise one of a plurality common image sensors. Common image sensors may include a color filter array that is co-located with the sensor pixels configured for converting incident photons into an electric signal for measuring an intensity of the incident light. Therein, the color filter array of the image sensor may correspond to the specified color array used in the method of an embodiment.

According to an embodiment of the disclosure, for the embodiments described in the paragraphs above, the target data may be obtained by applying at least one image filter to the standard color data set.

According to an embodiment of the disclosure, for the embodiments described in the paragraphs above, the input data may be obtained by applying an inverse filter of at least one image filter, to data in which the training raw image data is combined with the random noise. The training raw image data is preferably acquired by mosaicing standard color data sets that were generated by down-sampling sample raw image data. The resolution of the training raw image data is preferably less than or equal to the resolution of the sample raw image data. The at least one learning model can advantageously be trained such that output data for the input data further has the effect of the at least one image filter.

According to an embodiment of the disclosure, the at least one learning model includes at least one layer including at least one weight value, and the at least one learning model is trained by changing the at least one weight value such that a difference between output data obtained by inputting the input data to the at least one learning model, and the target data is reduced. Preferably, the at least learning model is based on a neural network and comprises neural network layers. Further preferred, each of the plurality of neural network layers has a plurality of weight values, and performs a neural network operation through an operation between an operation result of a previous layer and the plurality of weight values. The plurality of weight values in each of the plurality of neural network layers may be optimized by a result of training the at least learning model. The at least one learning model of the disclosure is preferably characterized by a (neural network) layer structure and weight values, wherein the weight values are optimized by training. The at least one learning model may be applied to a device, e.g., to a device of the present disclosure, by storing the (neural network) layer structure and initial weight values. The at least one learning model may be updated on the device by storing updated weight values on the devices (e.g., acquired by retraining).

According to an embodiment of the disclosure, the at least one learning model is retrained by using retraining input data and retraining target data, the retraining target data is generated based on a retraining standard color data set obtained from image data selected based on a user input, and the retraining input data is generated based on retraining raw image data generated based on the retraining standard color data set, and the random noise or based on raw image data corresponding to the selected image data. Preferably, retraining refers to repeated training of the at least one learning model on which the training is (has been) completely performed (previously).

According to an embodiment of the disclosure, the at least one learning model comprises a plurality of learning models, wherein each of the plurality of learning models is classified according to at least one of various attributes related to an image, a user and/or a hardware configuration of the electronic device. The various attributes for classifying the at least one learning model preferably include a filter applied to an image, a camera (lens) used for image capture, a vendor (manufacturer) of the image sensor, a type (model) of the electronic device, an image capture environment, characteristics of a captured object, a user's configuration, a user's selection or a combination thereof. One of the plurality of learning models is preferably selected for processing, at a time, a certain raw image data into noise-reduced image data in the electronic device of the present disclosure based on the classification, particularly preferred based on at least one of the various attributes. The attribute for selecting the one learning model preferably corresponds to a property of an image (filter data, meta data), a property of a lens used for capturing the raw image data, a property of the image sensor or the electronic device, a detected environment for capturing the raw image data, characteristics of a captured object, a user's configuration, a user's selection or a combination thereof.

According to an embodiment of the disclosure, the camera module includes a first camera module and a second camera module, the at least one learning model includes a first learning model corresponding to the first camera module and a second learning model corresponding to the second camera module, first raw image data obtained by using the first camera module is noise-reduced by using the first learning model, and second raw image data obtained by using the second camera module is noise-reduced by using the second learning model. This embodiment advantageously allows for creating noise-reduced image data from raw image data provided by each of the first and second camera module. Each of the first learning model and the second learning model may be trained as described above, wherein a plurality of pieces of first standard color data may be obtained by applying a down-sampling filter to sample raw image data of the first camera module and wherein a plurality of pieces of second standard color data may be obtained by applying a down-sampling filter to sample raw image data of the second camera module.

Various embodiments and terms used therefor of the disclosure are not for limiting the technologies described in the disclosure to a specific embodiment, and they should be interpreted to include all modifications, equivalents and/or alternatives of the embodiments of the disclosure. In relation to explanation of the drawings, similar reference numerals may be used for similar elements. The singular expression also includes the plural meaning as long as it is not inconsistent with the context. In this disclosure, expressions such as "A or B", "at least one of A and/or B", "A, B or C", or "at least one of A, B and/or C" include all possible combinations of the listed items. Also, throughout the disclosure, the expression "at least one of a, b or c" indicates only a, only b, only c, both a and b, both a and c, both b and c, all of a, b, and c, or variations thereof. The expressions "first", "second", and the like used in the disclosure may denote corresponding elements, regardless of order and/or importance, and may be used to distinguish one element from another, but does not limit the elements. When it is described that a certain element (e.g., first element) is "(operatively or communicatively) coupled with/to" or is "connected to" another element (e.g., second element), it should be understood that the certain element may be connected to the other element directly or through still another element (e.g., third element).

The term "module" used in the disclosure may include units embodied as hardware, software, or firmware, and may be used compatibly with terms such as, for example, logics, logic blocks, components, circuits, or the like. The "module" may be an integrally configured component or a minimum unit performing one or more functions or a part thereof. For example, the module may be embodied as an application-specific integrated circuit (ASIC).

Various embodiments of the disclosure may be embodied as software including instructions stored in a machine-readable storage medium (e.g., an internal memory or external memory) readable by a machine (e.g., a computer). The machine may be a device that calls instructions stored in a storage medium and is operable according to the called instructions, including an electronic device according to the disclosed embodiments. When the instructions are executed by a processor, the processor may perform the function corresponding to the instructions, either directly, or by using other components under the control by the processor. The instructions may include code obtained or executed by a compiler or an interpreter. The machine-readable storage medium may be provided in the form of a non-transitory storage medium. The term 'non-transitory' merely means that the storage medium does not include a signal but is tangible, and does not distinguish whether data is stored semi-permanently or temporarily on the storage medium.

According to an embodiment of the disclosure, the methods according to various embodiments disclosed herein may be provided in a computer program product. A computer program product may be traded between a seller and a purchaser as a commodity. The computer program product may be distributed in a form of a machine-readable storage medium (e.g., compact disk read only memory (CD-ROM)), or may be distributed online through an application store (e.g., Google™ Play). In the case of online distribution, at least part of the computer program product may be temporarily stored, or temporarily created, on a storage medium such as a manufacturer's server, a server of an application store, or a memory of a relay server.

Each of the elements (e.g., modules or programs) according to various embodiments of the disclosure may consist of a single entity or a plurality of entities, and some subelements of the above-mentioned subelements may be omitted, or other elements may be further included in various embodiments. Alternatively or additionally, some elements (e.g., modules or programs) may be integrated into one entity to perform the same or similar functions performed by each element prior to integration. Operations performed by modules, programs, or other elements, according to various embodiments of the disclosure, may be executed sequentially, in parallel, repetitively, or heuristically, or at least some operations may be performed in a different order, or omitted, or another operation may be further added.

A function related to an artificial intelligence according to the disclosure may operate via a processor and a memory. The processor may include one or more processors. In this case, the one or more processors may include, for example, a general-purpose processor such as a central processing unit (CPU), an application processor (AP), or a digital signal processor (DSP), a dedicated graphics processor such as a graphics processing unit (GPU), a vision processing unit (VPU), or a dedicated AI processor such as a neural processing unit (NPU). The one or more processors may control input data to be processed according to predefined operation rules or an artificial intelligence model stored in the memory. A single processor or multiple processors may disposed on a die, or on a package. When the one or more processors are dedicated artificial intelligence processors, the dedicated artificial intelligence processor may be designed with a hardware structure specialized for processing a specific artificial intelligence model.

The predefined operation rules or artificial intelligence model may be generated via a training process. Here, being generated via a training process may mean that the predefined operation rules or artificial intelligence model set to perform desired characteristics (or purposes), is obtained by training a basic artificial intelligence model by using a learning algorithm that utilizes a large number of training data. The training process may be performed by a device itself on which artificial intelligence according to the disclosure is performed, or by a separate server and/or system. Examples of the learning algorithm include, but are not limited to, supervised learning, unsupervised learning, semi-supervised learning, or reinforcement learning.

The artificial intelligence model may be comprised of a plurality of neural network layers. Each of the plurality of neural network layers has a plurality of weight values, and performs a neural network operation through an operation between an operation result of a previous layer and the plurality of weight values. The plurality of weight values in each of the plurality of neural network layers may be optimized by a result of training the artificial intelligence model. For example, the plurality of weight values may be refined to reduce or minimize a loss or cost value obtained by the artificial intelligence model during the training process. An artificial neural network may be a deep neural network (DNN), and may be, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

In the method, performed by an electronic device including a camera module, of generating noise-reduced image data of an object according to the disclosure, an artificial intelligence model may be used to generate a standard color data set for obtaining the noise-reduced image data from raw image data. The processor may preprocess the data to transform the data into a form suitable to be used as an input to an artificial intelligence model. The artificial intelligence model may be obtained by a training process. Here, being obtained via a training process may mean that the predefined operation rules or artificial intelligence model set to perform desired characteristics (or purposes), is obtained by training a basic artificial intelligence model by using a learning algorithm that utilizes a large number of training data. The artificial intelligence model may be comprised of a plurality of neural network layers. Each of the plurality of neural network layers has a plurality of weight values, and performs a neural network operation through an operation between an operation result of a previous layer and the plurality of weight values.

Inference/prediction may refer to technology for judging information for logical inference and prediction, and includes knowledge/probability-based reasoning, optimization prediction, preference-based planning, recommendation, or the like.

The invention claimed is:

1. A method, performed by an electronic device including a camera module, of generating noise-reduced image data of an object, the method comprising:
   obtaining, by a second processor of the electronic device, from a first processor of the electronic device, a control signal for obtaining image data;
   storing a learning model into a memory;
   obtaining, by using the camera module, raw image data of the object obtained from light received by the camera module, the raw image data having a color array of a plurality of colors with respect to a plurality of pixels;
   obtaining, by using the stored learning model, a color data set of the plurality of pixels from the obtained raw image data, the color data set comprising a plurality of pieces of color data representing the plurality of colors; and
   obtaining the noise-reduced image data of the object by using the obtained color data set,
   wherein the learning model is trained by using input data and target data,
   wherein the target data is obtained based on a standard color data set comprising a plurality of pieces of standard color data classified according to the plurality of colors, the plurality of pieces of standard color data being obtained by applying a down-sampling filter to sample raw image data, and
   wherein the input data is obtained based on training raw image data and random noise generated by a noise generator, the training raw image data being obtained by performing mosaicing based on the standard color data set.

2. The method of claim 1, wherein the target data is obtained based on a plurality of standard color data sets obtained from a plurality of pieces of sample raw image data that are captured in sequence.

3. The method of claim 2, wherein the input data is obtained based on a plurality of pieces of training raw image data and the random noise, the plurality of pieces of training raw image data being obtained by performing mosaicing based on each of the plurality of standard color data sets.

4. The method of claim 1, wherein the target data is obtained based on one of a plurality of standard color data sets obtained from a plurality of pieces of sample raw image data that are captured in sequence, and wherein the input data is obtained based on a plurality of pieces of training raw image data and the random noise, the plurality of pieces of training raw image data being obtained by performing mosaicing based on each of the plurality of standard color data sets.

5. The method of claim 1, wherein the color array is one of a Bayer pattern, a red-green-blue-emerald (RGBE) pattern, a red-yellow-yellow-blue (RYYB) pattern, a cyan-yellow-yellow-magenta (CYYM) pattern, a cyan-yellow-green-magenta (CYGM) pattern, a red-green-blue-white (RGBW) Bayer pattern, or an X-Trans pattern.

6. The method of claim 1, wherein the target data is obtained by applying at least one image filter to the standard color data set.

7. The method of claim 1, wherein the input data is obtained by applying an inverse filter of at least one image filter, to data in which the training raw image data is combined with the random noise.

8. The method of claim 1, wherein the learning model comprises at least one layer comprising at least one weight value, and
wherein the learning model is trained by changing the at least one weight value such that a difference between output data obtained by inputting the input data to the learning model, and the target data is reduced below a preset level.

9. The method of claim 1, wherein the learning model is retrained by using retraining input data and retraining target data,
wherein the retraining target data is obtained based on a retraining standard color data set obtained from image data selected based on a user input, and
wherein the retraining input data is obtained based on retraining raw image data and the random noise, the retraining raw image data being generated based on the retraining standard color data set.

10. The method of claim 1, wherein the learning model is retrained by using retraining input data and retraining target data,
wherein the retraining target data is obtained based on a retraining standard color data set obtained from image data selected based on a user input, and
wherein the retraining input data is obtained based on raw image data corresponding to the selected image data.

11. The method of claim 1, wherein the camera module includes a first camera module and a second camera module,
wherein the learning model comprises a first learning model corresponding to the first camera module and a second learning model corresponding to the second camera module,
wherein first raw image data obtained by using the first camera module is noise-reduced by using the first learning model, and
wherein second raw image data obtained by using the second camera module is noise-reduced by using the second learning model.

12. The method of claim 1, wherein a pixel value of the image data is obtained based on corresponding pixel values of the plurality of pieces of color data.

13. An electronic device for generating noise-reduced image data of an object, the electronic device comprising:
a camera module;
a first memory storing at least one at least one learning model;
a first processor electrically connected to the camera module and the first memory; and
an artificial intelligence processing unit communicatively connected to the camera module and the first processor, and comprising a second processor and a second memory,
wherein the first processor is configured to transmit, to the second processor, a control signal for obtaining image data, and
the second processor is configured to, in response to obtaining the control signal, store one learning model from among the at least one learning model into the second memory,
obtain, by using the camera module, raw image data of the object obtained from light received by the camera module, the raw image data having a color array of a plurality of colors with respect to a plurality of pixels,
obtain, by using the one learning model stored into the second memory, a color data set of the plurality of pixels from the obtained raw image data, the color data set comprising a plurality of pieces of color data classified according to the plurality of colors, and
obtain the noise-reduced image data of the object by using the obtained color data set.

14. The electronic device of claim 13, wherein the at least one learning model is trained by using input data and target data,
the target data is obtained based on a standard color data set comprising a plurality of pieces of standard color data classified according to the plurality of colors, the plurality of pieces of standard color data being obtained by applying a down-sampling filter to sample raw image data, and
the input data is obtained based on training raw image data obtained by performing mosaicing based on the standard color data set, and random noise generated by a noise generator.

15. The electronic device of claim 14, wherein the target data is obtained based on a plurality of standard color data sets obtained from a plurality of pieces of sample raw image data that are captured in sequence.

* * * * *